(12) United States Patent
Hernandez et al.

(10) Patent No.: US 11,072,674 B2
(45) Date of Patent: Jul. 27, 2021

(54) MULTIBLOCK COPOLYMER AND METHOD OF MAKING THEREOF

(71) Applicant: IOWA STATE UNIVERSITY RESEARCH FOUNDATION, INC., Ames, IA (US)

(72) Inventors: Nacu Hernandez, Ames, IA (US); Eric W. Cochran, Ames, IA (US); Ronald Christopher Williams, Ames, IA (US); Austin Hohmann, Dubuque, IA (US)

(73) Assignee: IOWA STATE UNIVERSITY RESEARCH FOUNDATION, INC., Ames, IA (US)

( * ) Notice: Subject to any disclaimer, the term of this patent is extended or adjusted under 35 U.S.C. 154(b) by 60 days.

(21) Appl. No.: 16/315,484

(22) PCT Filed: Jul. 7, 2017

(86) PCT No.: PCT/US2017/041033
§ 371 (c)(1),
(2) Date: Jan. 4, 2019

(87) PCT Pub. No.: WO2018/009753
PCT Pub. Date: Jan. 11, 2018

(65) Prior Publication Data
US 2019/0300637 A1     Oct. 3, 2019

Related U.S. Application Data

(60) Provisional application No. 62/359,461, filed on Jul. 7, 2016.

(51) Int. Cl.
| | | |
|---|---|---|
| C08F 220/68 | (2006.01) | |
| C08F 220/44 | (2006.01) | |
| C08F 293/00 | (2006.01) | |
| C08K 5/00 | (2006.01) | |
| C08L 95/00 | (2006.01) | |
| C09K 8/88 | (2006.01) | |
| C08F 220/20 | (2006.01) | |
| C09J 153/00 | (2006.01) | |
| C09K 8/68 | (2006.01) | |
| C09K 8/80 | (2006.01) | |

(52) U.S. Cl.
CPC .......... *C08F 220/68* (2013.01); *C08F 220/20* (2013.01); *C08F 220/44* (2013.01); *C08F 293/005* (2013.01); *C08K 5/0016* (2013.01); *C08L 95/00* (2013.01); *C09J 153/00* (2013.01); *C09K 8/68* (2013.01); *C09K 8/88* (2013.01); *C08F 2438/03* (2013.01); *C08F 2500/01* (2013.01); *C08L 2555/84* (2013.01); *C09K 8/80* (2013.01)

(58) Field of Classification Search
CPC .......... C08F 220/68; C08F 298/005; C08F 2500/01; C08F 220/44; C08L 95/00; C08L 2555/84; C09K 8/88; C08K 5/0016

USPC .......................................................... 524/59
See application file for complete search history.

(56) References Cited

U.S. PATENT DOCUMENTS

2014/0343192 A1* 11/2014 Cochran ............ C08F 8/04
                                               523/436

FOREIGN PATENT DOCUMENTS

| WO | 2014/189939 A2 | 11/2014 |
|---|---|---|
| WO | 2015/179553 A2 | 11/2015 |

OTHER PUBLICATIONS

Coumes et al., RSC Advances, 6, 53370-53377, 2016. (Year: 2016).*
You et al., Macromolecules, 37, 9761-9767, 2004. (Year: 2004).*
Chenal et al., Polym. Chem., 4, 752-762, 2013. (Year: 2013).*
International Search Report and Written Opinion for corresponding Application No. PCT/US2017/041033 (dated Oct. 20, 2017).
Frick et al., "Characterization of Polylactide-b-polyisoprene-b-polylactide Thermoplastic Elastomers," Biomacromol. 4(2):216-223 (2003).
Isik et al., "New Amphiphilic Block Copolymers from Lactic Acid and Cholinium Building Units," RSC Adv. 4:53407-53410 (2014).
Coumes et al., "Self-Assembly of Well-Defined Triblock Copolymers Based on Poly(Lactic Acid) and Poly(Oligo Ethylene Glycol) Methyl Ether Methacrylate) Prepared by ATRP," RSC Adv. 6:53370-53377 (2016).
You et al., "Preparation and Characterization of Thermally Responsive and Biodegradable Block Copolymer Comprised of PNIPAAM and PLA by Combination of ROP and RAFT Methods," Macromol. 37:9761-9767 (2004).
Chenal et al., "Ab Initio RAFT Emulsion Polymerization of Butyl Acrylate Mediated by Poly(Acrylic Acid) Trithiocarbonate," Polymer Chem. 4:752-762 (2013).

(Continued)

*Primary Examiner* — Hui H Chin
(74) *Attorney, Agent, or Firm* — Troutman Pepper Hamilton Sanders LLP (Rochester)

(57) ABSTRACT

The present invention relates to a method of preparing a multiblock copolymer. This method comprises i) providing a block copolymer comprising at least one PA block and at least one PB block, where PA represents a polymer block comprising one or more units of monomer A and PB represents a polymer block comprising one or more units of monomer B, with monomers A and B being the same or different, where the block copolymer contains a chain transfer agent moiety (CTA); ii) providing a radically polymerizable monomer C; and iii) polymerizing the block copolymer with monomer C under conditions effective to achieve a number average degree of polymerization (Nn) for the multiblock copolymer of up to 100,000 without gelation.

23 Claims, 5 Drawing Sheets

(56) References Cited

OTHER PUBLICATIONS

Perrier et al., "Versatile Chain Transfer Agents for Reversible Addition Fragmentation Chain Transfer (RAFT) Polymerization to Synthesize Functional Polymeric Architectures," Macromol. 37:2709-2717 (2004).

International Preliminary Report on Patentability for corresponding Application No. PCT/US2017/041033 (dated Jan. 17, 2019).

Nicolaÿ et al., "Synthesis of Poly(vinyl acetate) Block Copolymers by Successive RAFT and ATRP with a Bromoxanthate Iniferter," Chem. Commun. 5336-5338 (2008).

Tong et al., "Synthesis of Well-Defined Poly(vinyl acetate)-b-Polystyrene by Combination of ATRP and RAFT Polymerization," Macromolecules 41:7339-7346 (2008).

\* cited by examiner

MULTIBLOCK COPOLYMER AND METHOD OF MAKING THEREOF

This application is a national stage application under 35 U.S.C. § 371 of International Application No. PCT/US2017/041033, filed Jul. 7, 2017, which claims the benefit of U.S. Provisional Patent Application Ser. No. 62/359,461, filed Jul. 7, 2016, which are hereby incorporated by reference in their entirety.

FIELD OF THE INVENTION

The present invention relates to a multiblock copolymer and method of making thereof.

BACKGROUND OF THE INVENTION

Block copolymers are macromolecules composed of two or more different polymerized monomers where each block has a distinct physical property. This attribute has made them very attractive in the specialty chemicals sector, which contributes as much as 90% of the total value of the petroleum industry (Hernandez et al. "The Battle for the "Green" Polymer. Different Approaches for Biopolymer Synthesis: Bioadvantaged vs. Bioreplacement," *Organic & Bimolecular Chemistry* 12(18):2834-2849 (2014)). Block copolymers are usually synthesized using a living chain growth polymerization chemistry such as anionic polymerization or reversible addition fragmentation chain transfer (RAFT) polymerization. For this reason, the variety of block copolymers that can be synthesized has been limited to the constraints that chain growth polymerization places on the chemistry of the monomeric building blocks from which the polymers are constructed. Chain growth polymerization has been required for the synthesis of block copolymers, because these chemistries allow the design of precise block architectures, e.g., $[A]_m$-$[B]_n$-$[C]_o$. In contrast, step growth polymerization (also known as polycondensation) lacks the architectural control that chain growth methods afford; however, step growth methods are compatible with a much broader family of building blocks, including many bio-based molecules such as sugars and their derivatives. The pervasive array of every-day materials manufactured in this fashion is a testament to the breadth and diversity of polymer properties achievable with step growth polymerization.

Biobased polymers over the past decade have gained increased interest for their potential to be used in a broad spectrum of applications (Liu et al., "Preparation and Characterization of a Thermoplastic Poly(glycerol sebacate) Elastomer by Two-Step Method," *Journal of Applied Polymer Science* 103(3):1412-1419 (2007)). Moreover, when compared to today's petroleum based polymers; biopolymers can potentially offer higher biodegradability, better recyclability, and lower process energy requirements, with a smaller environmental footprint overall. However, the shift to biopolymers will not occur until they represent a superior value opportunity for the industry when compared with their petroleum-based counterparts (Hernandez et al. "The Battle for the "Green" Polymer. Different Approaches for Biopolymer Synthesis: Bioadvantaged vs. Bioreplacement," *Organic & Bimolecular Chemistry* 12(18):2834-2849 (2014)). Moreover, many important biomonomers, may only be economically polymerized through step growth polymerization. For example, L-lactic acid is a chiral biomolecule that forms a high-melting semicrystalline homopolymer, poly(L-lactic acid) (PLLA). PLLA is already a commercialized material, owing to its facile step growth polymerization and economical feedstock cost (on the order of $0.75-$0.80 per pound). On the other hand, while block copolymers based on PLLA have excellent mechanical properties, for example as thermoplastic elastomers, the only known routes these materials involve the ring opening polymerization of L- or D-lactide, a precursor far more costly than lactic acid (Liu et al., "Preparation and Characterization of a Thermoplastic Poly(glycerol sebacate) Elastomer by Two-Step Method," *Journal of Applied Polymer Science* 103(3):1412-1419 (2007)).

Polylactide-b-polyisoprene-b-polylactide (PLA-PI-PLA) triblock copolymers were prepared from α,ω-dihydroxy polyisoprene (HO-PI-OH) (Frick et al., "Characterization of Polylactide-b-polyisoprene-b-polylactide Thermoplastic Elastomers," *Biomacromolecules* 4(2):216-223 (2003)). These triblock copolymers were free of homopolymer or diblock contaminants (Frick et al., "Characterization of Polylactide-b-polyisoprene-b-polylactide Thermoplastic Elastomers," *Biomacromolecules* 4(2):216-223 (2003)).

Biorenewable polylactide-b-polymenthide-b-polylactide triblock copolymers were prepared by the controlled polymerization of lactide and an aluminum alkoxide macroinitiator, with the latter being produced from a telechelic polymer and triethylaluminum (Wanamaker et al., "Renewable-Resource Thermoplastic Elastomers Based on Polylactide and Polymenthide," *Biomacromolecules* 8(11):3634-3640 (2007)). The telechelic polymer was synthesized by the ring-opening polymerization of menthide in the presence of diethylene glycol (Wanamaker et al., "Renewable-Resource Thermoplastic Elastomers Based on Polylactide and Polymenthide," *Biomacromolecules* 8(11):3634-3640 (2007)). These triblock copolymers behaved as thermoplastic elastomers (Wanamaker et al., "Renewable-Resource Thermoplastic Elastomers Based on Polylactide and Polymenthide," *Biomacromolecules* 8(11):3634-3640 (2007)).

The syntheses and uses of versatile chain transfer agents (CTAs) that produce well-controlled macromolecular architectures with specific chain-end functionalities, via reversible addition fragmentation chain transfer (RAFT) polymerization were reported (Perrier et al., "Versatile Chain Transfer Agents for Reversible Addition Fragmentation Chain Transfer (RAFT) Polymerization to Synthesize Functional Polymeric Architectures." *Macromolecules* 37(8):2709-2717 (2004)). Examples of architectures included amphiphilic copolymers and block copolymers incorporating a biodegradable block (Perrier et al., "Versatile Chain Transfer Agents for Reversible Addition Fragmentation Chain Transfer (RAFT) Polymerization to Synthesize Functional Polymeric Architectures." *Macromolecules* 37(8):2709-2717 (2004)). The described CTAs were also used for the grafting of poly(styrene), poly(methyl methacrylate) and poly(methyl acrylate) from cotton (Perrier et al., "Versatile Chain Transfer Agents for Reversible Addition Fragmentation Chain Transfer (RAFT) Polymerization to Synthesize Functional Polymeric Architectures." *Macromolecules* 37(8):2709-2717 (2004)).

The present invention is directed to overcoming these and other deficiencies in the art.

SUMMARY OF THE INVENTION

One aspect of the present invention relates to a method of preparing a multiblock copolymer. This method comprises providing a block copolymer comprising at least one PA block and at least one PB block, where PA represents a polymer block comprising one or more units of monomer A and PB represents a polymer block comprising one or more units of monomer B, with monomers A and B being the same or different, where the block copolymer contains a chain transfer agent moiety (CTA). A radically polymerizable monomer C is also provided. The block copolymer is polymerized with monomer C under conditions effective to achieve a number average degree of polymerization ($N_n$) for the multiblock copolymer of up to 100,000 without gelation.

Another aspect of the present invention relates to a multiblock copolymer comprising at least one PA block, at least one PB block, and at least one PC block, where PC block is positioned between PA block and PB block, where PC block is a rubber block, and where PA represents a polymer block comprising one or more units of monomer A, PB represents a polymer block comprising one or more units of monomer B, and PC represents a polymer block comprising one or more units of monomer C, with monomers A and B being the same or different.

The present invention employs a family of methods by which the diverse and cost-effective chemistries of polycondensation-type polymers are married with the architectural control afforded only by chain growth polymerization to form multiblock copolymers in one single reaction. This property is particularly beneficial to thermoplastic elastomers (TPE) that require a soft block (rubber block) between two symmetric hard blocks to fully behave as elastomers. By creating a telechilic macrochain transfer agent, the price gap of biopolymer synthesis can be closed by beginning with pre-synthesized polymers, such as PLLA, which were produced by polycondensation. One or both chain ends were chemically modified to serve as either telechilic macrochain transfer agents (macro-CTAs) or macroinitiators for subsequent reversible addition—fragmentation chain-transfer (RAFT) polymerization or atom transfer radical polymerization (ATRP). These so called "Macro-CTA/initiators" were then used to synthetize multi-blocks copolymers in one single reaction, thus combining the advantages of both step and chain growth polymerization methodologies.

The present invention is the synthesis of telechilic macro-CTAs which produces multiblocks copolymers (more than two blocks) with symmetric blocks.

DETAILED DESCRIPTION OF THE INVENTION

Figure 1:
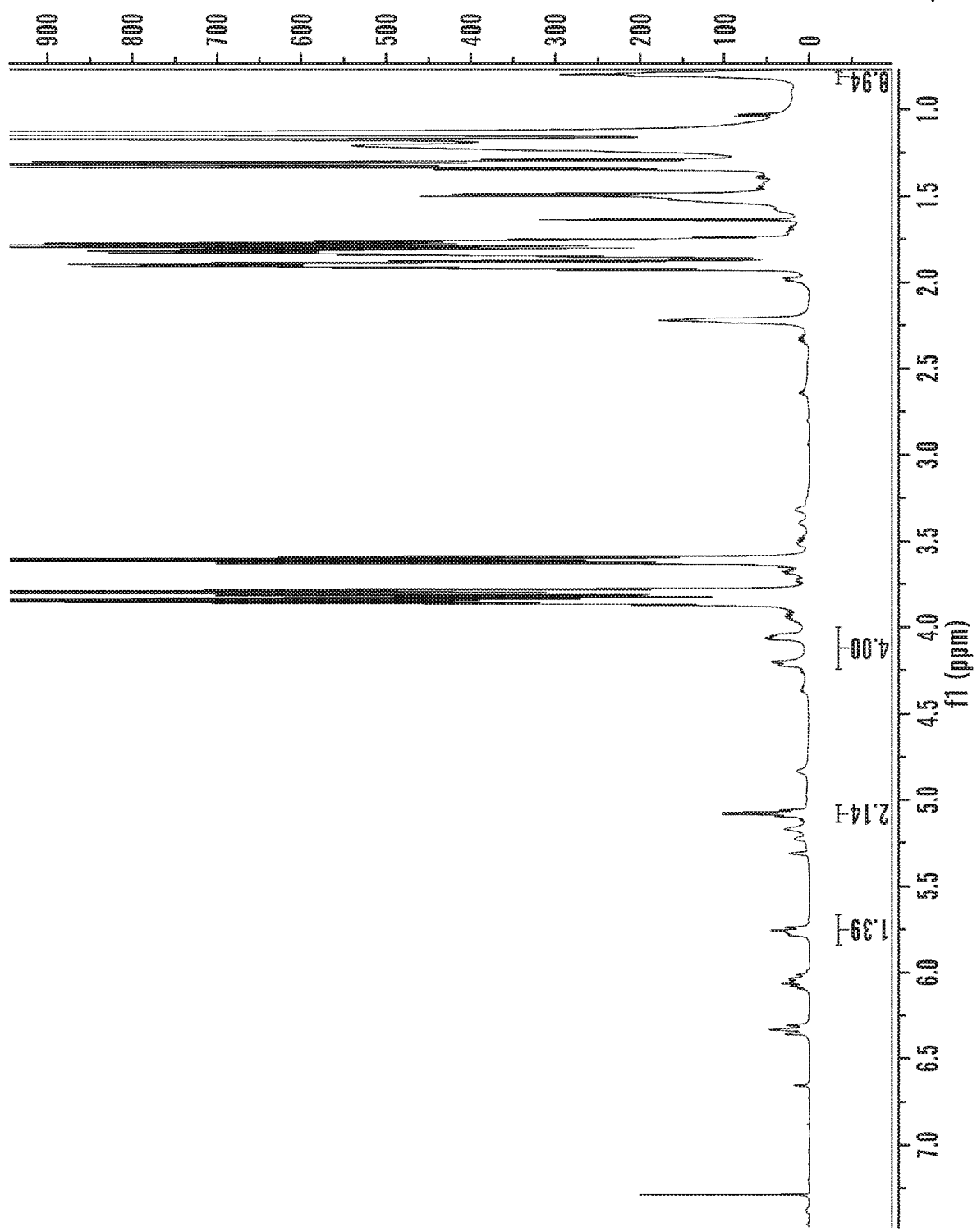
FIG. 1 shows $^1$H-NMR of the block copolymer of poly L-Lactic Acid with polymerized acrylated epoxidized soybean oil (PLLA-PAESO).

One aspect of the present invention relates to a method of preparing a multiblock copolymer. This method comprises providing a block copolymer comprising at least one PA block and at least one PB block, where PA represents a polymer block comprising one or more units of monomer A and PB represents a polymer block comprising one or more units of monomer B, with monomers A and B being the same or different, where the block copolymer contains a chain transfer agent moiety (CTA). A radically polymerizable monomer C is also provided. The block copolymer is polymerized with monomer C under conditions effective to achieve a number average degree of polymerization ($N_n$) for the multiblock copolymer of up to 100,000 without gelation.

According to the present invention multiblock copolymers contain more than two blocks (three or more blocks). In some embodiments, multiblock copolymers can contain symmetric blocks. In some embodiments several blocks of the multiblock copolymer can be made from the same monomer, where the length of the polymeric block can be the same or different. The multiblock copolymer can be a linear or light-branched copolymer.

In some embodiment, PA and PB blocks are prepared using step growth polymerization (polycondensation).

The PA block is made by polymerizing one or more monomers, and has an average molecular weight of about 1 to about 300 kDa, or about 10 to about 30 kDa. The PA block may comprise repeating units of monomer A. For instance, the PA block can be a polymerized linear-chain or branched-chain monomer A or radicals thereof. The PB block is made by polymerizing one or more monomers, and has an average molecular weight of about 1 to about 300 kDa, or about 10 to about 30 kDa. The PB block may comprise repeating units of monomer B. For instance, the PB block can be a polymerized linear-chain or branched-chain monomer B or radicals thereof. The PC block is made by polymerizing one or more radically polymerizable monomers C, and has an average molecular weight of about 5 to about 500 kDa, or about 40 to about 80 kDa. The PC block may comprise repeating units of monomeric plant oil containing one or more triglycerides. For instance, the PC block can be a polymerized linear-chain or branched-chain monomeric plant oil, or radicals thereof.

Monomer A is selected from the group consisting of L-lactic acid, adipic acid, ethylene glycol, terephthalic acid, dihydromuconic acid, benzene-1,4-dicarboxylic acid, glucose, glycogen, galactose, silk, glycerol, 1,6-diaminohexane, 1,4-diaminobenzene, or any other condensable monomer.

Monomer B is selected from the group consisting of L-lactic acid, styrene, α-methyl styrene, t-butyl styrene, vinyl xylene, vinyl naphthalene, vinyl pyridine, divinyl benzene, methyl acrylate, methyl (meth)acrylate, ethyl (meth)acrylate, propyl (meth)acrylate, butyl (meth)acrylate, heptyl (meth)acrylate, hexyl (meth)acrylate, acrylonitrile, adiponitrile, methacrylonitrile, butadiene, isoprene, and mixtures thereof.

In one embodiment, the PC block is polymerized from one or more monomeric plant oils containing one or more triglycerides. The monomeric plant oils used in the block copolymer can be any plant oil that is radically polymerizable, particularly those that contain one or more types of triglycerides. Suitable plant oils include, but are not limited to, a variety of vegetable oils such as, soybean oil, peanut oil, walnut oil, palm oil, palm kernel oil, sesame oil, sunflower oil, safflower oil, rapeseed oil, linseed oil, flax seed oil, colza oil, coconut oil, corn oil, cottonseed oil, olive oil, castor oil, false flax oil, hemp oil, mustard oil, radish oil, ramtil oil, rice bran oil, salicornia oil, tigernut oil, tung oil, etc., and mixtures thereof. A typical vegetable oil used herein is soybean oil, and the resulting PC block is polymerized triglyceride or triglyceride derivatives.

Vegetable oils are mixtures of triglycerides. A representative structure of a triglyceride is shown as below:

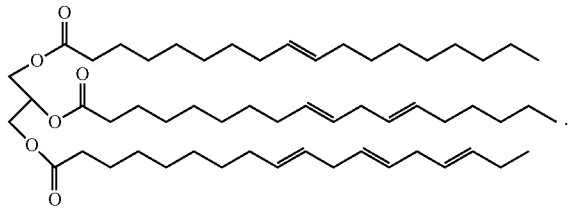 [SMILES: CC/C=C/C/C=C/C/C=C/CCCCCCCC(=O)OCC(COC(=O)CCCCCCC/C=C/CCCCCCCC)OC(=O)CCCCCCC/C=C/C/C=C/CCCCC]

A typical triglyceride structure contains a number of double bonds that may serve as candidates for polymerization. Various soybean cultivars express a variety of triglyceride compositions in their oils. Different strains of soybeans may be appropriately selected based on the triglyceride compositions to enhance the block copolymer yield and properties.

In unprocessed oils, the double bonds contained in triglycerides are typically located in the middle of the alkyl chains, and have limited reactivity towards propagation reactions due to steric hindrance and unfavorable stability of the free radical. This reactivity improves dramatically when the double bonds are conjugated (Li et al., "Soybean Oil-Divinylbenzene Thermosetting Polymers: Synthesis, Structure, Properties and their Relationships," *Polymer* 42(4): 1567-1579 (2001); Henna et al., "Biobased Thermosets from Free Radical Copolymerization of Conjugated Linseed Oil," *Journal of Applied Polymer Science* 104:979-985 (2007); Valverde et al., "Conjugated Low-Saturation Soybean Oil Thermosets: Free-Radical Copolymerization with Dicyclopentadiene and Divinylbenzene," *Journal of Applied Polymer Science* 107:423-430 (2008); Robertson et al., "Toughening of Polylactide with Polymerized Soybean Oil," *Macromolecules* 43:1807-1814 (2010), which are hereby incorporated by reference in their entirety). The conjugation of double bonds in triglycerides may be readily achieved to nearly 100% conversion with homogeneous Rh catalysis (Larock et al., "Preparation of Conjugated Soybean Oil and Other Natural Oils and Fatty Acids by Homogeneous Transition Metal Catalysis," *Journal of the American Oil Chemists' Society* 78:447-453 (2001), which is hereby incorporated by reference in its entirety).

In any embodiment of the present invention, the polymerizable plant oil monomer containing triglyceride can be replaced with a polymerizable monomer containing one or more triglycerides from an animal source, for instance, animal fats. Thus, the PC block in any embodiment of the present invention can instead be polymerized from one or more monomeric animal fat containing one or more triglycerides. Examples of suitable animal fats used in accordance with the present invention include, but are not limited to, beef or mutton fat such as beef tallow or mutton tallow, pork fat such as pork lard, poultry fat such as turkey and/or chicken fat, and fish fat/oil. The animal fats can be obtained from any suitable source including restaurants and meat production facilities.

"Triglycerides," as defined herein, may refer to any unmodified triglyceride naturally present in plant oil or animal fat as well as any derivatives of unmodified triglycerides. An unmodified triglyceride may include any ester derived from glycerol with three similar or different fatty acids. Triglyceride derivatives may include any modified triglycerides that contain conjugated systems (i.e. a system of connected p-orbitals with delocalized electrons in triglycerides). Such conjugated systems increase the reactivity of triglycerides towards propagation reactions. Useful conjugated triglycerides include, but are not limited to, triglyceride derivatives containing conjugated double bonds or conjugated systems formed by acrylate groups.

The term "soybean oil" used herein may refer broadly to any raw soybean oil or processed soybean oil that contains at least one form of triglyceride or its derivative suitable for the polymerization reaction of the present invention. The term "conjugated soybean oil" used herein refers to any raw soybean oil or processed soybean oil containing at least one triglyceride with at least one conjugated site. Similar definitions also apply to other plant oil or conjugated plant oil.

The conjugated triglyceride may contain one or more conjugated sites. For instance, the conjugated triglyceride may contain a single conjugated site per triglyceride. Alternatively, each fatty-acid chain of the triglyceride may contain one or more conjugated sites.

A further description of conjugation sites in soybean oil, epoxidation of soybean oil, and acrylation of soybean oil can be found in NACU BERNARDO HERNANDEZ-CANTU, "SUSTAINABILITY THROUGH BLOCKCOPOLYMERS—NOVEL ION EXCHANGE CATHODE MEMBRANES AND SOYBEAN OIL BASED THERMOPLASTIC ELASTOMER," (Iowa State University, Ames, Iowa 2012), which is incorporated herein by reference in its entirety.

In one embodiment, the conjugated plant oil is acrylated epoxidized plant oil, such as acrylated epoxidized soybean oil (AESO); the conjugated triglyceride is acrylated epoxidized triglyceride.

Monomer C can also be a radically polymerizable glycerol derivative. In one embodiment, monomer C is an acrylated glycerol.

In another embodiment, monomer C can also be a vinyl, acrylic, diolefin, nitrile, dinitrile, or acrylonitrile monomer. Vinyl aromatic monomers are exemplary vinyl monomers that can be used in the block copolymer, and include any vinyl aromatics optionally having one or more substituents on the aromatic moiety. The aromatic moiety can be either mono- or polycyclic. Exemplary monomers for the PC block include styrene, α-methyl styrene, t-butyl styrene, vinyl xylene, vinyl naphthalene, vinyl pyridine, divinyl benzene, methyl acrylate, $C_1$-$C_6$ (meth)acrylate (i.e., methyl methacrylate, ethyl methacrylate, propyl (meth)acrylate, butyl (meth)acrylate, heptyl (meth)acrylate, or hexyl (meth)acrylate), acrylonitrile, adiponitrile, methacrylonitrile, butadiene, isoprene, and mixtures thereof. Moreover, two or more different monomers can be used together in the formation of the PC block.

In one embodiment, the block copolymer has an architecture of PA-PB-CTA or PA-CTA-PB.

In another embodiment, the chain transfer agent has a telechelic (TCTA) character with molecular structure as —S—C(S)—S—.

Telechelic chain transfer agent is typically based on trithiocarbonate functionality (—S—C(S)—S—). Polymers produced from the chain transfer agent based on trithiocarbonate functional group retain the CTA functionality in the statistical center of the chain, as opposed to polymers produced by a dithiocarbonate-based CTA, which retain the CTA functionality at the end of the polymeric chain. The telechelic chain transfer agent is capable of adding polymer blocks symmetrically from the interior where the trithiocarbonate functionality is located, i.e., polymerizing monomers from both ends, forming symmetrical architecture or polymer blocks.

In some embodiments, the block copolymer has an architecture of PA-PB-TCTA-PB, PA-PB-TCTA-PA, PA-TCTA-PB-PA, or PA-PB-TCTA-PB-PA.

In another embodiment, said providing the block copolymer comprises providing a polymer comprising at least one PA block, wherein one end or both ends of the PA block is functionalized with a chain transfer group or an initiator group; providing a polymer comprising at least one PB block, wherein one end or both ends of the PB block is functionalized with a chain transfer group or an initiator group; and reacting the polymer comprising the at least one functionalized PA block with the polymer comprising the at least one functionalized PB block under conditions effective to produce the block copolymer.

According to the present invention, the term "initiator group" refers to, but is not limited to, halogen, —SH, vinyl, alcohol, tosyl, alkyne, amine, azide, isocyanate, and acid.

The term "halogen" means fluoro, chloro, bromo, or iodo.

In a further embodiment, the step of providing the polymer comprising the at least one PA block comprises providing a monomer A; polymerizing the monomer A, by step growth polymerization, in a solvent suitable for dissolving the at least one PA block; and functionalizing the at least one PA block with one or more chain transfer groups or one or more initiator groups to produce a functionalized PA block.

The term "step growth polymerization" or "polycondensation" refers to a polymerization that progresses by repetition of a so-called step reaction. In a step-growth polymerization, the molecular weight of the polymer chain builds up slowly and there is only one reaction mechanism for the formation of polymer. The polymerization reaction proceeds by individual reactions of the functional groups on the monomers. Thus, two monomers react to form a dimer. The dimer may now react with another dimer to produce a tetramer, or the dimer may react with more monomer to form a trimer. This process continues, each reaction of the functional groups proceeding essentially at the same reaction rate until over a relatively long period of time, a high molecular weight polymer is obtained.

In another embodiment, the step of providing the polymer comprising the at least one PB block comprises providing a monomer B; polymerizing the monomer B in a solvent suitable for dissolving the at least one PB block; and functionalizing the at least one PB block with one or more chain transfer groups or one or more initiator groups to produce a functionalized PB block.

In another embodiment, polymerizing the monomer B is carried out by step growth polymerization.

In yet another embodiment, the step of providing the block copolymer comprises providing a polymer comprising at least one PA block, wherein one end or both ends of the PA block is functionalized with a chain transfer group or an initiator group. A radically polymerizable monomer B is also provided. The at least one functionalized PA block is polymerized with the radically polymerizable monomer B under conditions effective to achieve a number average degree of polymerization ($N_n$) for the block copolymer of up to 100,000 without gelation.

The polymerizing step is performed through controlled free radical polymerization which involves living/controlled polymerization with free radical as the active polymer chain end (Moad et al., "The Chemistry of Radical Polymerization—Second Fully Revised Edition," Elsevier Science Ltd. (2006), which is hereby incorporated by reference in its entirety). This form of polymerization is a form of addition polymerization where the ability of a growing polymer chain to terminate has been removed. The rate of chain initiation is thus much larger than the rate of chain propagation. The result is that the polymer chains grow at a more constant rate than seen in traditional chain polymerization and their lengths remain very similar. The polymerizing step typically occurs in the presence of a free radical initiator, and a catalyst or a chain transfer agent to form the polymer.

One form of controlled free radical polymerization is Radical Addition-Fragmentation Chain Transfer (RAFT). Radical Addition-Fragmentation Chain Transfer (RAFT) polymerization is a type of living polymerization or controlled polymerization, utilizing a chain transfer agent (CTA). Conventional RAFT polymerization mechanism, consisting of a sequence of addition-fragmentation equilibria, is shown in Moad et al., "Living Radical Polymerization by the Raft Process—a First Update," *Australian Journal of Chemistry* 59: 669-92 (2006), which is incorporated herein by reference in its entirety. The RAFT polymerization reaction starts with initiation. Initiation is accomplished by adding an agent capable of decomposing to form free radicals; the decomposed free radical fragment of the initiator attacks a monomer yielding a propagating radical ($P_{\cdot n}$), in which additional monomers are added producing a growing polymer chain. In the propagation step, the propagating radical ($P_{\cdot n}$) adds to a chain transfer agent (CTA), followed by the fragmentation of the intermediate radical forming a dormant polymer chain and a new radical (R.). This radical (R.) reacts with a new monomer molecule forming a new propagating radical ($P_{\cdot m}$). In the chain propagation step, ($P_{\cdot n}$) and ($P_{\cdot m}$) reach equilibrium and the dormant polymer chain provides an equal probability to all polymers chains to grow at the same rate, allowing polymers to be synthesized with narrow polydispersity. Termination is limited in RAFT, and, if it occurs, it is negligible. Targeting a specific molecular weight in RAFT can be calculated by multiplying the ratio of monomer consumed to the concentration of CTA used by the molecular weight of the monomer.

The initiating agents often are referred to as "initiators." Suitable initiators depend greatly on the details of the polymerization, including the types of monomers being used, the type of catalyst system, the solvent system, and the reaction conditions. A typical radical initiator can be azo compounds, which provide a two-carbon centered radical. Radical initiators such as benzoyl peroxide, azobisisobutyronitrile (AIBN), 1,1' azobis(cyclohexanecarbonitrile) (ABCN), or 4,4'-Azobis(4-cyanovaleric acid) (ACVA); high temperature initiators, such as t-butylperoxide, and dicumylperoxide; redox initiator such as benzoyl peroxide/N,N-dimethylaniline; microwave heating initiator; photoinitiator such as (2,4,6-trimethylbenzoyl)-diphenylphosphine oxide; gamma radiation initiator; or Lewis acids such as scandium (III) triflate or yttrium (III) triflate, are typically used in RAFT polymerization.

RAFT polymerization can use a wide variety of CTA agents. Suitable CTA agents should be capable of initiating the polymerization of the monomers (styrene and AESO) and achieve a narrow polydispersity in the process. For a RAFT polymerization to be efficient, the initial CTA agents and the polymer RAFT agent should have a reactive C=S double bond; the intermediate radical should fragment rapidly without side reactions; the intermediate should partition in favor of products, and the expelled radicals (R.) should efficiently re-initiate polymerization. Suitable CTA agent is typically a thiocarbonylthio compound (ZC(=S)SR:

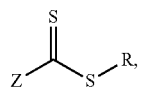

where R is free radical leaving group and Z is a group that modifies addition and fragmentation rates of RAFT polymerization). Exemplary CTA agents include, but are not limited to, a dithioester compound (where Z=aryl, heteraryl, or alkyl), a trithiocarbonate compound (where Z=alkylthio, arylthio, or heteroarylthio), a dithiocarbamate compound (where Z=arylamine or heterarylamine or alkylamine), and a xantate compound (where Z=alkoxy, aryloxy, or heteroaryloxy), that are capable or reversible association with polymerizable free radicals. Z can also be sulfonyl, phosphonate, or phosphine. A more extensive list of suitable CTA agents (or RAFT agents) can be found in Moad et al., "Living Radical Polymerization by the Raft Process—a First Update," *Australian Journal of Chemistry* 59: 669-92 (2006); Moad et al., "Living Radical Polymerization by the Raft Process—a Second Update," *Australian Journal of Chemistry* 62(11):1402-72 (2009); Moad et al., "Living Radical Polymerization by the Raft Process—a Third Update," *Australian Journal of Chemistry* 65: 985-1076 (2012); Skey et al., "Facile one pot synthesis of a range of reversible addition-fragmentation chain transfer (RAFT) agents." *Chemical Communications* 35: 4183-85 (2008), which are hereby incorporated by reference in their entirety. Effectiveness of the CTA agent depends on the monomer being used and is determined by the properties of the free radical leaving group R and the Z group. These groups activate and deactivate the thiocarbonyl double bond of the RAFT agent and modify the stability of the intermediate radicals (Moad et al., "Living Radical Polymerization by the Raft Process—a Second Update," *Australian Journal of Chemistry* 62(11):1402-72 (2009), which is hereby incorporated by reference in its entirety). Typical CTA agents used are 1-phenylethyl benzodithioate or 1-phenylethyl 2-phenylpropanedithioate.

More details for selection of initiators and reaction conditions for RAFT reaction as well as detailed descriptions for RAFT polymerization can be found in U.S. Patent Application Publication No. 2014/0343192 A1 to Cochran et al., which is hereby incorporated by reference in its entirety.

Another form of living free radical polymerization is atom transfer radical polymerization. Atom transfer radical polymerization (ATRP) is a catalyzed, reversible redox process that achieves controlled polymerization via facile transfer of labile radicals (e.g., halide radicals) between growing polymer chains and a catalyst (Davis et al., "Atom Transfer Radical Polymerization of tert-Butyl Acrylate and Preparation of Block Copolymers," *Macromolecules* 33:4039-4047 (2000); Matyjaszewski et al., "Atom Transfer Radical Polymerization," *Chemical Reviews* 101:2921-2990 (2001), which are hereby incorporated by reference in their entirety). In ATRP, chain termination and transfer reactions are essentially eliminated by keeping the free radical concentration small. Briefly, the mechanism by which ATRP operates may be summarized as:

  (1)

  (2)

In Equation (1), the labile radical X may be a halogen (e.g., Br, Cl) attached to end of a polymer P. The catalyst, $Cu_IBr$, reversibly abstracts this halogen, forming a polymer free radical (P·). The equilibrium achieved between inert polymers and active polymer free radicals strongly favors the left side ($K \ll 10^{-8}$). Equation (2) is the standard free radical propagation reaction between a polymer of length i and a monomer M. The small free radical concentration ensured by equation (1) virtually eliminates termination reactions, and the halogen functionality is retained on polymers produced, which allows the production of copolymers from nearly any monomer amenable to conventional free radical polymerization.

The ATRP polymerization reaction starts with initiation. Initiation is accomplished by adding an agent capable of decomposing to form free radicals; the decomposed free radical fragment of the initiator attacks a monomer yielding a monomer-free radical, and ultimately produces an intermediate capable of propagating polymerization. These agents often are referred to as "initiators." The initiation is typically based on the reversible formation of growing radicals in a redox reaction between various transition metal compounds and an initiator.

Suitable initiators depend greatly on the details of the polymerization, including the types of monomers being used, the type of catalyst system, the solvent system and the reaction conditions. Simple organic halides are typically used as model halogen atom transfer initiators. Exemplary initiators are aralkyl halides or aryl halides, such as benzyl bromide or benzyl chloride.

In ATRP, the introduction of a catalyst system to the reaction media is required to establish the equilibrium between active states (active polymer free radicals for the growth of the polymer) and dormant states (the formed inert polymer). The catalyst is typically a transition metal compound being capable of participating in a redox cycle with the initiator and a dormant polymer chain. The transition-metal compound used herein is a transition-metal halide. Any transition metal that can participate in a redox cycle with the initiator and dormant polymer chain, but does not form a direct C-metal bond with the polymer chain, is suitable in the present invention. The exemplary transition metal includes $Cu^{1+}$, $Cu^{2+}$, $Fe^{2+}$, $Fe^{3+}$, $Ru^{2+}$, $Ru^{3+}$, $Ru^{4+}$, $Ru^{5+}$, $Ru^{6+}$, $Cr^{2+}$, $Cr^{3+}$, $Mo^{0}$, $Mo^{+}$, $Mo^{2+}$, $Mo^{3+}$, $W^{2+}$, $W^{3+}$, $Mn^{3+}$, $Mn^{4+}$, $Rh^{+}$, $Rh^{2+}$, $Rh^{3+}$, $Rh^{4+}$, $Re^{2+}$, $Re^{3+}$, $Re^{4+}$, $Co^{+}$, $Co^{2+}$, $Co^{3+}$, $V^{2+}$, $V^{3+}$, $V^{4+}$, $V^{5+}$, $Zn+$, $Zn^{2+}$, $Au+$, $Au^{2+}$, $Au^{3+}$, $Hg^{+}$, $Hg^{2+}$, $Pd^{0}$, $Pd^{+}$, $Pd^{2+}$, $Pt^{0}$, $Pt^{+}$, $Pt^{2+}$, $Pt^{3+}$, $Pt^{4+}$, $Ir^{+}$, $Ir^{2+}$, $Ir^{3+}$, $Ir^{4+}$, $Os^{2+}$, $Os^{3+}$, $Os^{4+}$, $Nb^{2+}$, $Nb^{3+}$, $Nb^{4+}$, $Nb^{5+}$, $Ta^{3+}$, $Ta^{4+}$, $Ta^{5+}$, $Ni^{0}$, $Ni^{+}$, $Ni^{2+}$, $Ni^{3+}$, $Nd^{0}$, $Nd^{+}$, $Nd^{2+}$, $Nd^{3+}$, $Ag^{+}$, and $Ag^{2+}$. A typical transition-metal catalyst system is $CuCl/CuCl_2$.

The ligand serves to coordinate with the transition metal compound such that direct bonds between the transition metal and growing polymer radicals are not formed, and the formed copolymer are isolated. The ligand can be any N-, O-, P- or S-containing compound that coordinates with the transition metal to form a σ-bond, any C-containing compound that coordinates with the transition metal to form a π-bond, or any C-containing compound that coordinates with the transition metal to form a C-transition metal π-bond but does not form a C—C bond with the monomers under the polymerizing conditions. A typical ligand used herein is pentamethyldiethylene-triamine (PMDETA).

The state of the art of ATRP has been reviewed by Matyjaszewski (Matyjaszewski et al., "Atom Transfer Radical Polymerization," *Chemical Reviews* 101:2921-2990 (2001), which is hereby incorporated by reference in its entirety). More details for selection of initiators and catalysts/ligand system for ATRP reaction can be found in U.S. Pat. No. 5,763,548 to Matyjaszewski et al. and U.S. Pat. No. 6,538,091 to Matyjaszewski et al., which are hereby incorporated by reference in their entirety.

In one embodiment, the polymerizing is carried out by reversible addition-fragmentation chain-transfer polymerization (RAFT), in the presence of a free radical initiator and a solvent.

In RAFT polymerization, reaction time, temperature, and solvent concentration should be chosen appropriately to ensure the production of non-crosslinked elastomers. Reaction time relates closely to the temperature the reaction is carried out at: higher temperature requires shorter reaction times and lower temperature requires longer reaction times.

Temperatures for the RAFT polymerization can range from room temperature to up to 300° C. The optimal temperature is the minimum at which polymerization can occur over reasonable time scales, e.g., 6-48 hours. Typical reaction temperatures for a RAFT reaction is 250° C. or lower, for instance, from 0 to 250° C., from 50 to 220° C., from 80 to 200° C., from 40 to 100° C., from 50 to 85° C., or from 0 to 50° C. In one embodiment, the polymerizing is carried out in a solvent at a temperature of 50 to 140° C.

The monomer to CTA ratio can vary depending upon the desired molecular weight. In one embodiment, RAFT polymerization is carried out at a molar ratio of the chain transfer agent to the monomer ranging from 1:1 to 1:10000.

The solvent is selected based the requirements of monomer solubility and a normal boiling point compatible with the polymerization temperature. The solvent used in the RAFT polymerization may be glycerol, toluene, THF, chloroform, cyclohexane, dioxane, dimethyl sulfoxide, dimethyl formamide, acetone, acetonitrile, n-butanol, n-pentanol, chlorobenzene, dichloromethane, diethylether, tert-butanol, 1,2,-dichloroethylene, diisopropylether, ethanol, ethylacetate, ethylmethylketone, heptane, hexane, isopropylalcohol, isoamylalcohol, methanol, pentane, n-propylacohol, pentachloroethane, 1,1,2,2,-tetrachloroethane, 1,1,1,-trichloroethane, tetrachloroethylene, tetrachloromethane, trichloroethylene, water, xylene, benzene, nitromethane, or a mixture thereof. In one embodiment, the solvent is methanol, glycerol, or a mixture thereof.

The solvent can further include stabilizers, surfactants, or dispersants.

The concentrations of the monomer used in the reactions depend partially on the solubility of the monomer and the polymer products as well as the evaporation temperature of the solvent. Solvent concentration can affect the gelation of the polymer. Insufficient solvent in the RAFT reaction can cause the polymer to crosslink in a shorter time period without ever reaching high enough conversions. Therefore, the solvent is typically added in excess to allow the polymer chains to grow and obtain a conversion rate to 80% without risk of the polymer reaching the gel point. The concentration of the monomer dissolved in the solvent in the RAFT reactions may range from 1% to 100% weight percentage monomer. Typically, a monomer concentration of less than 90 wt % is suitable to ensure the solubility of the resulting polymers and additionally to prevent premature gelation.

In one embodiment, the method is carried out in the presence of a solvent, with the monomer having a concentration, when dissolved in the solvent, ranging from 1 wt % to 90 wt %, for instance, from 1 wt % to 40 wt %, from 1 wt % to 10 wt %, or from 20 wt % to 30 wt %.

In another embodiment, the free radical initiator is selected from the group consisting of benzoyl peroxide, azobisisobutyronitrile, 1,1'-azobis(cyclohexanecarbonitrile), t-butylperoxide, and dicumylperoxide.

In another embodiment, polymerizing is carried in the presence of a chain transfer agent. The chain transfer agent can be a thiocarbonylthio compound, a dithioester compound, a trithiocarbonate compound, a dithiocarbamate compound, or a xanthate compound capable of reversible association with polymerizable free radicals. In a further embodiment, the chain transfer agent is 1-phenylethyl benzodithioate, 1-phenylethyl 2-phenylpropanedithioate, or dibenzyl carbonotrithioate.

In one embodiment, polymerizing is carried out by atom transfer radical polymerization (ATRP), in the presence of a solvent, a catalyst, a counter catalyst, an initiator, and a ligand.

Polymerization can be carried out at a temperature of 150° C. or lower. The optimal temperature is the minimum at which polymerization can occur over reasonable time scales, e.g., 6-48 hours. Typical reaction temperature for ATRP according to the present invention is 150° C. or lower, for instance, from 20° C. to 140° C., or from 50° C. to 120° C.

Solvent is selected based the requirements of mutual polymer solubility and a normal boiling point compatible with the polymerization temperature. The solvent used in the ATRP may be toluene, THF, chloroform, cyclohexane, or a mixture thereof. Typical solvent used for ATRP is toluene. Monomer concentrations in the reactions depend partially on the solubility of the monomer and the polymer products as well as the evaporation temperature of the solvent. The concentration of monomers dissolved in the solvent in the ATRP reactions may range from 5% to 100% weight percentage monomer. Typically, a monomer concentration of less than 50% by mass is suitable to ensure the solubility of the resulting polymers and additionally to prevent premature gelation.

Benzyl bromide or benzyl chloride can be used as initiator in ATRP. CuX (X=Br or Cl) can be used as the catalyst system and PMDETA can be used as the ligand. Typically, a 1:1 molar ratio of $Cu_1X$:PX is sufficient to establish the equilibrium between active and dormant states of the resulting polymers. $CuX_2$ can be used a counter-catalyst to further reduce the polymer free radical concentration. Typically, a 0.1:1 molar ratio of counter-catalyst: catalyst and a 1:1 molar ratio of ligand:(catalyst+counter-catalyst) are desirable to ensure the solvation of the catalyst. The molecular weight of the resulting polymer is governed in part through the monomer:initiator molar ratio, which may vary between 5:1 to 1000:1.

In one embodiment, the method is carried out in the presence of a solvent, without a counter-catalyst.

In one embodiment, the method is carried out in the presence of a counter-catalyst and a solvent.

The solvent concentration can range from 5% to 100% by mass ratio of the solvent to the monomer C. For instance, the solvent concentration can range from 10% to 40 wt % by mass ratio of the solvent to the monomer C.

In another embodiment, the PA block comprises repeating units of monomer A and the PB block comprises repeating units of monomer B.

The above-described controlled radical polymerization can be used to produce the multiblock copolymer with a molecular weight ranging 1 kDa to 20,000 kDa without gelation, for instance, a molecular weight of 5 kDa to 20,000 kDa without gelation, or a molecular weight of 7 kDa to 10,000 kDa without gelation.

After the polymerization, the polymerized multiblock copolymer may be further catalytically hydrogenated to partially or fully saturate the PA, PB, or PC blocks. This process removes reactive unsaturation from the rubbery component, yielding improved resistance to oxidative degradation, reduced crosslinkability and increased resistance to chemical attack. Moreover, hydrogenation precludes gelation on subsequent block additions.

In another embodiment, the method further includes polymerizing the multiblock copolymer with the monomer A, the monomer B, the monomer C, both the monomer B and the monomer C, both the monomer A and the monomer C, both the monomer A and the monomer B, or the monomer A, the monomer B, and the monomer C under conditions effective to form an extended multiblock copolymer.

The invention consists of the modification of the product of a polycondensation reaction. That is, the chemical reaction of small molecules with an "A"-type chemical functionality (e.g., organic acid) and a "B"-type functionality (e.g., alcohol), or alternatively two different types of molecules each having two "A" groups and two "B" groups such that the following reactions take place:

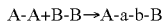

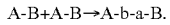

Polymers synthesized in this manner will have unreacted "A" and "B" groups on the chain ends, and unreactive "a" and "b" groups forming the repeating structure along the chain backbone. For example, L-lactic acid is an "A-B" type monomer that undergoes the reaction summarized in Scheme 1, producing the PLLA macromolecule and in the process eliminating one molecule of water in the process.

Scheme 1

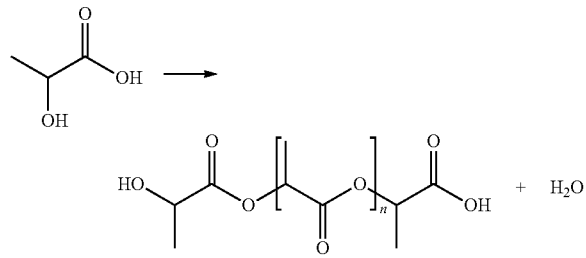

It was found that it is straightforward to exploit the reactivity of the "A" or "B" chain end functionality to attach moieties such as primary halogens that serve as good leaving groups for ATRP chemistry, i.e., moieties that allow the ATRP of chain growth compatible monomers from one or both chain ends of the starting polycondensation product. Similarly, di- or tri-carbonothioate groups were attached to the chain ends, which are known to serve as chain transfer agents capable of achieving RAFT polymerization, another type of living chain growth polymerization that allows the construction of block copolymers.

Another aspect of the present invention relates to a multiblock copolymer comprising at least one PA block, at least one PB block, and at least one PC block, where PC block is positioned between PA block and PB block, where PC block is a rubber block, and where PA represents a polymer block comprising one or more units of monomer A, PB represents a polymer block comprising one or more units of monomer B, and PC represents a polymer block comprising one or more units of monomer C, with monomers A and B being the same or different.

In one embodiment, the multiblock copolymer further comprises the chain transfer agent moiety (CTA).

In another embodiment, the chain transfer agent has a telechelic (TCTA) nature with molecular structure as —S—C(S)—S—.

In yet another embodiment, the multiblock copolymer comprises an architecture of PA-PC-PB.

In one embodiment, monomers A and B are the same. In an alternative embodiment, monomers A and B are different.

Another aspect of the present invention relates to an asphalt binder composition. The asphalt binder composition comprises the multiblock copolymer and a crumb rubber.

Asphalt is defined by the ASTM as a dark brown to black cement-like material in which the predominant constituents are bitumens that occur in nature or are obtained in petroleum processing. Asphalts characteristically contain saturates, aromatics, resins and asphaltenes. The terms "asphalt" and "bitumen" are often used interchangeably to mean both natural and manufactured forms of the material, which are all within the scope of the compositions and methods contemplated and described herein. Hereinafter, only the term "asphalt" will be used to describe suitable asphalt and bitumen materials.

The type of asphalt suitable for use in the compositions and methods contemplated and described herein are not particularly limited and include any naturally occurring, synthetically manufactured and modified asphalts known now or in the future. Naturally occurring asphalt is inclusive of native rock asphalt, lake asphalt, and the like. Synthetically manufactured asphalt is often a byproduct of petroleum refining operations and includes air-blown asphalt, blended asphalt, cracked or residual asphalt, petroleum asphalt, propane asphalt, straight-run asphalt, thermal asphalt, and the like. Modified asphalt includes base asphalt (e.g., neat or unmodified asphalt that can be naturally occurring or synthetically manufactured) modified with elastomers, phosphoric acid, polyphosphoric acid, plastomers, ground tire rubber (GTR), reclaimed asphalt pavement (RAP), reclaimed asphalt single (RAS), and the like, or various combinations of these modifiers.

Furthermore, industry-grade asphalts, including without limitation, paving-grade asphalts, are advantageous for use in the compositions and methods contemplated and described herein. Non-exclusive examples of paving-grade asphalts include asphalts having any one of the following performance grade ratings: PG 46-34, PG 52-34, PG 52-28, PG 58-28, PG 64-22, PG 64-16, PG 64-10, PG 67-22, PG 70-28, PG 70-22, PG 70-16, PG 70-10, PG 76-28, PG 76-22, PG 76-16 and PG 76-10. Additionally, non-exclusive examples of paving-grade asphalts within the scope of the present invention include paving-grade asphalts having any one of the following penetration grades: 50/70, 60/90, 80/100, 80/120, and 120/150.

Additionally, it is contemplated that industry-grade asphalts, such as roof-grade asphalts, may be advantageously used in the asphalt binder compositions contemplated and described herein. In such embodiments, the asphalt binder compositions will be useful for roofing applications. Suitable roofing-grade asphalts include, for example, but not limited to, asphalts having any one of the following hardness grades: 100/150 dmm pen, 150/200 dmm pen, 200/300 dmm pen, and 300+dmm pen, such as, but not limited to PG 58-28, 64-22, 67-22, 70-22, and 76-22.

In some embodiments of the asphalt binder composition, the asphalt is present at a concentration of from about 65 to about 99 weight % (wt %), based on the total weight of the asphalt binder composition. For example, the asphalt may be present at a concentration of from about 70 to 90 wt %, or from about 65 to about 75 wt %, or from about 75 to about 99 wt %, or from about 75 to about 95 wt %, or from about 75 to about 85 wt %, or even from about 85 to about 99 wt %, based on the total weight of the asphalt binder composition. In some exemplary embodiments, the asphalt is present at a concentration of from about 94 to about 99 wt %, such as about 96.5 wt %, based on the total weight of the asphalt binder composition.

Additionally, the asphalt binder composition may further comprise additives. Such additives are typically used to improve certain properties of the asphalt binder composition and products to be made therefrom (e.g., penetration (i.e., hardness), viscosity, and softening point). Non-exclusive examples of such additives suitable for inclusion in the asphalt binder compositions contemplated and described herein include, without limitation, plastomers, elastomers, waxes, polyphosphoric acids, flux oils, plasticizers, antioxidants, and combinations thereof, among others, such as, for example, recycled ground tire rubber, crumb rubber or polyoctenamer, and anti-strip additives, non-limiting examples of which are hydrated lime and amines.

In some embodiments of the asphalt binder composition, the one or more additional additives together are present at a total concentration of from about 0.5 to about 20 wt %, based on the total weight of the asphalt binder composition. For example, the total concentration of such additional additives in the asphalt binder composition may be from about 0.5 to about 1.0 wt %, or from about 1.0 to about 5.0 wt %, or from about 5.0 to about 10 wt %, or even from about 10 to about 20 wt %, based on the total weight of the asphalt binder composition. More particularly, in some embodiments the asphalt binder composition may comprise a total concentration of such additional additives of from about 1 to about 2 wt %, such as about 1 wt %, based on the total weight of the asphalt binder composition.

Suitable elastomers may, for example, be selected from the group consisting of natural rubber and synthetic polymerized rubber. Other non-exclusive examples of suitable elastomers or plastomers include butyl, polybutadiene, polyisoprene and polyisobutene rubber; styrene/butadiene copolymer such as styrene/butadiene/styrene triblock copolymer (SBS); styrene/ethylene-butylene/styrene triblock copolymer (SEBS); poly(styrene-isoprene-styrene) (SIS); ethylene-methacrylate (EMA); ethylene-propylene diene monomer (EPDM); ethylene-vinyl-acetate (EVA); and ethylene-butyl acrylate-glycidyl methacrylate terpolymer.

Waxes suitable for use as an additional additive in the asphalt binder composition may be functionalized or synthetic waxes or naturally occurring waxes. Furthermore, the wax may be oxidized or non-oxidized. Non-exclusive examples of synthetic waxes include ethylene bis-stearamide wax (EBS), Fischer-Tropsch wax (FT), oxidized Fischer-Tropsch wax (FTO), polyolefin waxes such as polyethylene wax (PE), oxidized polyethylene wax (OxPE), polypropylene wax, polypropylene/polyethylene wax, alcohol wax, silicone wax, petroleum waxes such as microcrystalline wax or paraffin, and other synthetic waxes. Non-exclusive examples of functionalized waxes include amine waxes, amide waxes, ester waxes, carboxylic acid waxes, and microcrystalline waxes. Naturally occurring wax may be derived from a plant, from an animal, or from a mineral, or from other sources known now or in the future. Non-exclusive examples of natural waxes include plant waxes such as candelilla wax, carnauba wax, rice wax, Japan wax and jojoba oil; animal waxes such as bees wax, lanolin and whale wax; and mineral waxes such as montan wax, ozokerite and ceresin. Mixtures of the aforesaid waxes are also suitable, such as, for example, the wax may include a blend of a Fischer-Tropsch (FT) wax and a polyethylene wax.

Phosphoric acid is another substance that may be used as an additional additive in some embodiments of the asphalt binder composition, in conventional amounts, for example, to raise the product's softening point. The phosphoric acid may be provided in any suitable form, including a mixture of different forms of phosphoric acid. For example, some suitable different forms of phosphoric acid include phosphoric acid, polyphosphoric acid, superphosphoric acid, pyrophosphoric acid, and triphosphoric acid.

Plasticizers may also be used as additional additives, in conventional amounts, to increase the plasticity or fluidity of an asphalt binder composition in accordance with embodiments described herein. Non-exclusive examples of suitable plasticizers include hydrocarbon oils (e.g., paraffin, aromatic and naphthenic oils), long chain alkyl diesters (e.g., phthalic acid esters, such as dioctyl phthalate, and adipic acid esters, such as dioctyl adipate), sebacic acid esters, glycol, fatty acid, phosphoric and stearic esters, epoxy plasticizers (e.g., epoxidized soybean oil), polyether and polyester plasticizers, alkyl monoesters (e.g., butyl oleate), and long chain partial ether esters (e.g., butyl cellosolve oleate).

Anti-oxidants may be used in conventional amounts as additional additives for the asphalt binder compositions to prevent the oxidative degradation of polymers that causes a loss of strength and flexibility in these materials.

Another aspect of the present invention relates to an adhesive or sealant composition. The adhesive or sealant composition comprises the multiblock copolymer and a tackifier, and/or a plasticizer, and/or a solvent. Suitable solvents include, but are not limited to, water, and an organic solvent such as dimethyl sulfoxide (DMSO), dimethylformamide (DMF), benzene, dioxane, toluene, chloroform, hexane, cyclohexane, xylene, carbon tetrachloride, acetone, acetonitrile, butanol, heptane, and ethanol. Suitable tackifiers include, but are not limited to, isosorbide-based tackifiers; Piccotac™1095 and Piccotac™8095; glycerol ester tackifiers, such as Staybelite™ Ester 10-E Ester of Hydrogenated Rosin and Staybelite™ Ester 3-E Ester of Hydrogenated Resin; Floral™ AX-E Fully Hydrogenated Rosin; phenolic resins; styrenated terpenes; polyterpenes; rosin esters; terpene phenolics; and monomeric resins. Suitable plasticizers include, but are not limited to, benzoflex 2088 (DEGD); abietic acid; Eastman™ Triacetin; Eastman 168™ non-phthalate plasticizer; polyalkylene esthers, such as polyethylene glycol, polytetramethylene glycol, polypropylene glycol, and mixtures thereof; glyceryl monostearate; octyl epoxy soyate, epoxidized soybean oil, epoxy tallate, and epoxidized linseed oil; polyhydroxyalkanoate; glycols, such as thylene glycol, pentamethylene glycol, and hexamethylene glycol; anionic or cationic plasticizers, such as dioctyl sulfosuccinate, alkane sulfonate, and sulfonated fatty acid; phthalate or trimellitate plasticizers; polyethylene glycol di-(2-ethylhexoate); citrate esters; naphthenic oil and dioctyl phthalate; white oil; lauric, sebacic, or citric acids esters; nonfugitive polyoxyethylene aryl ether; copolymer of ethylene and carbon monoxide; photopolymerizable unsaturated liquid plasticizer; and sorbitol.

Another aspect of the present invention relates to a tire composition. The tire composition comprises the multiblock copolymer and a rubber compound.

The tire composition may further include, if necessary, a reinforcing filler, and/or a silane coupling agent, and/or a crosslinking agent, and/or a vulcanization accelerator.

Suitable reinforcing fillers include carbon black and inorganic fillers, and the reinforcing filler is preferably at least one selected from the carbon black and inorganic fillers.

Suitable inorganic fillers include silica, aluminum hydroxide, clay, alumina, talc, mica, kaolin, glass balloon, glass beads, calcium carbonate, magnesium carbonate, magnesium hydroxide, calcium carbonate, magnesium oxide, titanium oxide, potassium titanate, and barium sulfate, and combinations thereof.

Suitable crosslinking agents include a sulfur-based crosslinking agent, an organic peroxide-based crosslinking agent, an inorganic crosslinking agent, a polyamine crosslinking agent, a resin crosslinking agent, a sulfur compound-based crosslinking agent, oxime-nitrosamine-based crosslinking agent, and sulfur. Among these the sulfur-based crosslinking agent is preferred.

Suitable vulcanization accelerators include: guanidine-based compounds, aldehyde-amine-based compounds, aldehyde-ammonia-based compounds, thiazole-based compounds, sulfenamide-based compounds, thiourea-based compounds, thiuram-based compounds, dethiocarbamate-based compounds, and xanthate-based compounds.

The tire composition may further include, if necessary, a reinforcing agent, a softening agent, a filler, a co-agent, a colorant, a flame retardant, a lubricant, a foaming agent, a plasticizer, a processing aid, an antioxidant, an age resister, an anti-scorch agent, an ultraviolet rays protecting agent, an antistatic agent, a color protecting agent, and other compounding agents.

In one embodiment, the multiblock copolymers of the present invention can be used as an additive in the fracking fluid or as a fracking fluid. The fracking fluid may further comprise water and sand. A typical recipe for a fracking fluid comprises about 90% water, about 8-9% sand, and about 1-2% other chemicals such as biocides, acids, inhibitors, stabilizers, crosslinkers, friction reducers, pH adjusting agents, iron control, surfactants, and gelling agents. The multiblock copolymers can be used as a substitute for the gelling agents such as guar gum, can serve as a thickening agent for water, as a crosslinking agent, as a pH adjusting agent, as a breaking agent, or as a biocide. The fracking fluid composition can also comprise a thermoplastic polymer block added to confer a desired fluid property to the multiblock copolymer of the present invention. Suitable thermoplastic polymer block that can be added to the multiblock copolymers, discussed in the above embodiments, and can be used herein.

Another aspect of the present invention relates to an asphalt composition. The asphalt composition comprises (i) an asphalt component; (ii) a crumb rubber having a weight percentage in the range of 1% to 15%; and (iii) the multiblock copolymer as an asphalt additive, modifier, and/or filler having a weight percentage in the range of 0.01% to 1.05%. Any of the multiblock copolymer discussed in the above embodiments can be used herein.

A typical source of crumb rubber is ground tire rubber (GTR). Two basic types of GTR are available based on the processes of preparing the GTR: cryogenic GTR is produced by shredding the tire into relatively large pieces and then subjecting the rubber to grinding under cryogenic conditions; ambient or warm-ground GTR is produced under warm or ambient grinding procedure. The shredding and pulling apart of the tire rubber at ambient temperatures produces irregular particles having a high surface area which desirably increases the number of reactive sites available for bonding or cross-linking with the copolymer. There are many sources of GTR and the material can be used in the vulcanized or a devulcanized form. Devulcanized GTR produced by either an oxidative or reductive process can be used.

GTR of various particle sizes can be incorporated into an asphalt cement. Typically, any GTR having particle sizes smaller than about 10 mesh can be used. Exemplary ground tire rubbers have particle sizes capable of passing 20 mesh to 80 mesh screens, for instance, 30 mesh to 40 mesh screens.

Another suitable source of crumb rubber is ground industrial waste rubber. These materials can be produced by either ambient grinding or cryogenic grinding. Different types of crumb rubbers can be mixed to achieve desired properties.

The aggregate used to prepare the asphalt component can be one or a mixture of the various standard aggregates used in the art, including gravel, crushed rock, stone, quarry gravel, and recycled paving material.

To enhance certain performance specifications, other asphalt modifiers or additives can be incorporated in the asphalt composition. For instance, mineral oil, heating oils, vegetable oils, or light petroleum distillates can be added to an asphalt binder to maintain the PG value within an acceptable range.

Multiblock copolymer can have a weight percentage in the range of 0.1 wt % to 30 wt % relative to the weight of the crumb rubber, e.g., a range of 0.1 wt % to 7 wt %, or 2.5 wt % to 6.5 wt % relative to the weight of the crumb rubber.

Another aspect of the present invention relates to a method for preparing a homogeneous asphalt composition. The method comprises mixing a multiblock copolymer as an asphalt additive, modifier, and/or filler, with a weight percentage in the range of 0.01% to 1.05%, into an asphalt composition to form a homogeneous asphalt composition. The asphalt composition comprises i) an asphalt component, and ii) a crumb rubber having a weight percentage in the range of 1% to 15%. Any multiblock copolymer discussed in the above embodiments can be used herein.

Suitable crumb rubbers, sizes of the crumb rubbers, aggregate used to prepare the asphalt component, other asphalt modifiers or additives, and detailed asphalt rubber formulations that have been described in the above embodiments relating to the asphalt composition, and are also suitable for the method of preparing the homogeneous asphalt composition herein.

One way to mix the multiblock copolymer into an asphalt composition is by premixing GTR and the multiblock copolymer, then adding the pre-mixture to an asphalt component, typically a hot liquified asphalt cement, and continuing the mixing at the same temperature range.

Alternatively, the GTR can be mixed with an asphalt component, typically a hot liquified asphalt cement. The multiblock copolymer is then added into the mixture, and the mixing is continued at the same temperature range.

The mixing temperature can depend upon the qualities and characteristics of the asphalt cement. The mixing of the multiblock copolymer with the asphalt rubber composition is typically carried out at a temperature range of 130° C. to 180° C.

Another aspect of the present invention relates to a method for preparing a fracking liquid. The method comprises mixing the multiblock copolymer as a chemical additive, with water, and sand.

Another aspect of the present invention relates to a method for preparing an adhesive or sealant composition. The method comprises mixing the thermoplastic multiblock copolymer with a tackifier, and/or a plasticizer, and/or a solvent.

The following examples are provided to illustrate embodiments of the present invention, but they are by no means intended to limit the scope.

EXAMPLES

Example 1—Synthesis of Poly(L-Lactic Acid) Based Chain Transfer Agents

The synthesis of poly(l-lactic acid) based chain transfer agents is shown in Scheme 2. The terminal hydroxyl group (of the polycondensation polymer) underwent esterification with an alky halide (2-bromopropionyl bromide) to produce poly(l-lactic methyl acetyl bromide) (PLLA-MAB) (this molecule can serve as a macro-initiator that will produce diblock copolymers via ATRP). The neutralization of the hydrogen bromide with water is highly reactive. The end product is called poly-1-lactic methyl acetyl bromide and the bromide group easily manipulated for the chain transfer agent. The bromide on the PLLA-MAB was then reacted, in presence of potassium hydroxide, with thiourea to produce an intermediate thioium salt, hydrochloric acid was then added to replace the thioium salt with a thiol to produce poly(l-lactic acid methylacetylthiol) (PLLA-MAT) (this molecule can serve as a macro-CTA that will produce diblock copolymers via RAFT). Final synthetic step consisted of the addition of carbon disulfide, potassium hydroxide, and the PLLA-MAB to the PLLA-MAT to produce the poly(l-lactic acid dimethylacetyltrithiol) (PLLA-DMAS) (this molecule serve as a macro-CTA that will produce triblock copolymers).

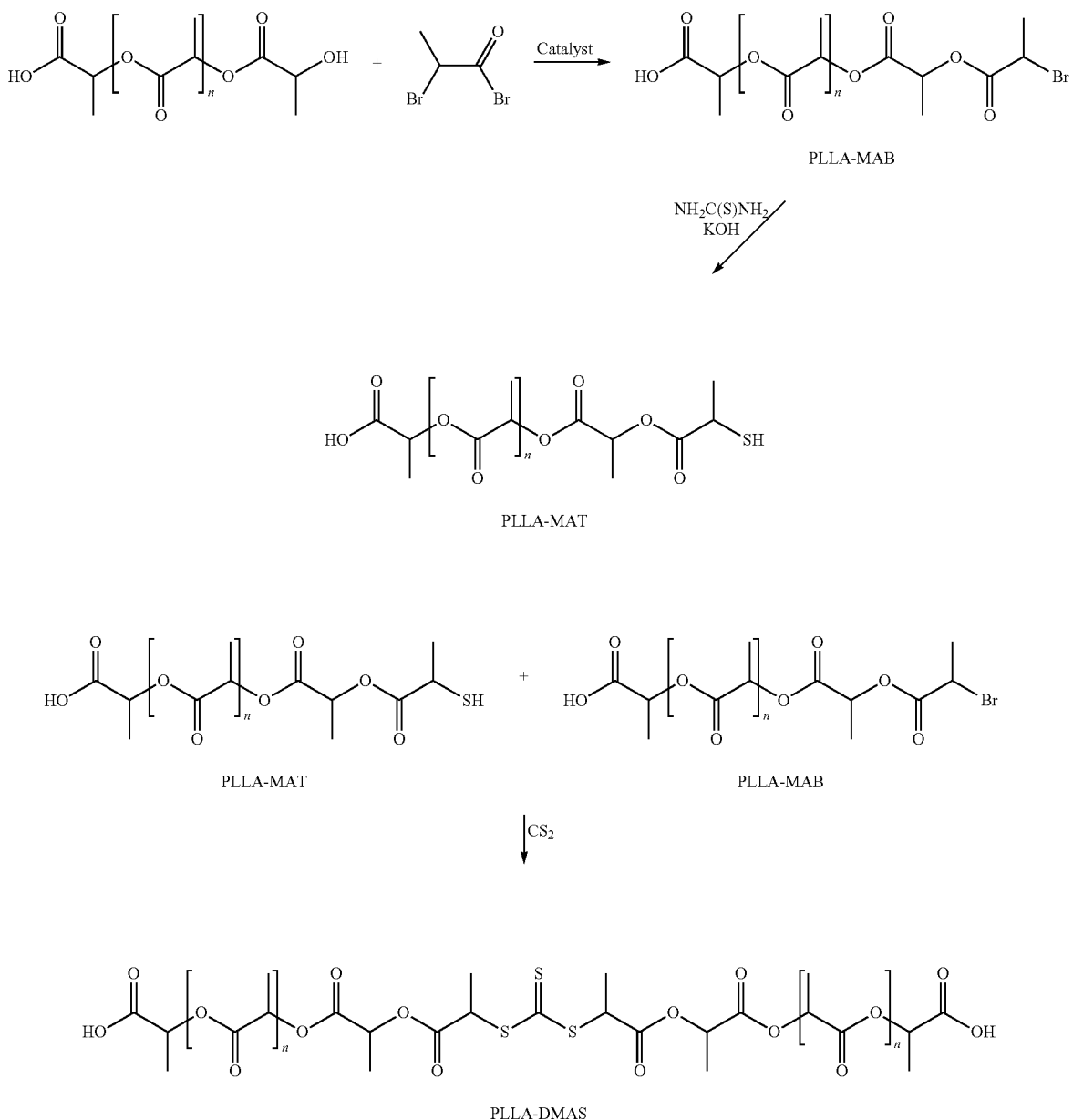

Scheme 2

The synthesis of poly(l-lactic acid) based chain transfer agents is shown in Scheme 3. The acetone, chloroform, and carbon disulfide were then reacted, in presence of sodium hydroxide solution, with phase transfer catalyst (tetrabutylammonium bromide) to produce intermediate salt, hydrochloric acid was then added to acidify the salt to produce 2,2'-thiocarbonylbis (sulfanediyl)bis-2-methylpropanoic acid (TCBS-CTA) (Wei et al., "Synthesis and Characterization of Bead-like poly-(N-isopropylacrylamide) Copolymers with Double Decker Silsesquioxane in the Main Chains," *Polym. Chem.* 6:256-269 (2015), which is hereby incorporated by reference in its entirety). The hydroxyl on the TCBS-CTA was then reacted, in presence of thyonil chloride, with DMF to produce a halogenated CTA called bis(1-chloride-2-methyl-1-oxopropan-2-yl) carbonotrithioate (the chloride group easily manipulated for the macro chain transfer agent). The neutralization of the hydrogen chloride with water is highly reactive. The final synthetic step consisted of the terminal hydroxyl group (of the polycondensation polymer) undergoing esterification with an alky halide on the CTA (BCMOPEC) to produce poly(l-lactic bis(1-chloride-2-methyl-1-oxopropan-2-yl)carbonotrithioate) (PLLA-BCMOPEC) (this molecule serves as a macro-CTA that will produce triblock copolymers).

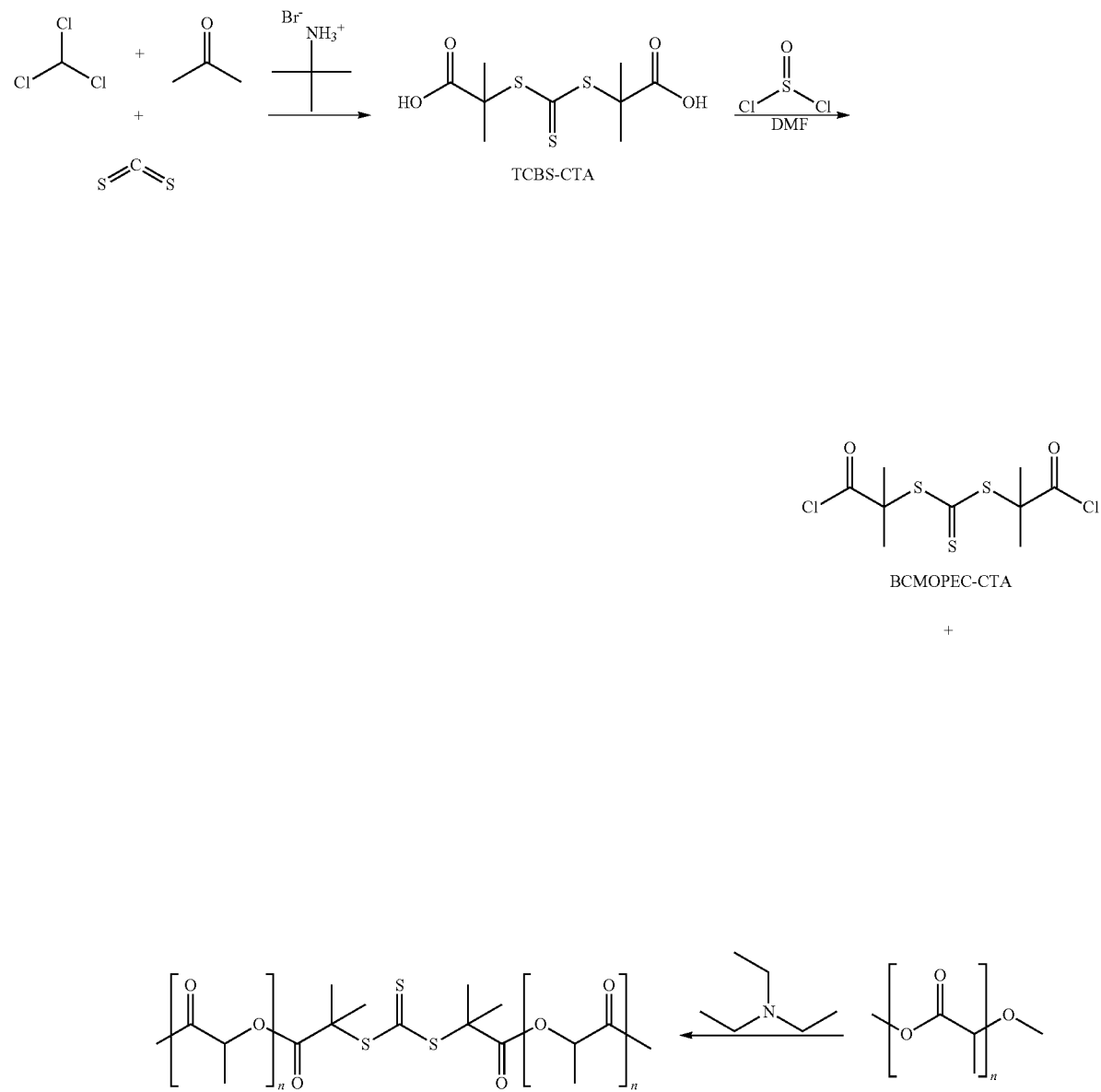

Scheme 3

The macro-CTAs can then be used to copolymerize different monomers and form a wide variety of polymers, i.e. thermoplastic elastomers, thermosets, copolymers, block copolymers, etc. Several different block-copolymers were created that resulted in materials with thermoplastic and elastomeric properties. Two monomers different monomers were used as a second block: acrylated epoxidized soybean oil (AESO) and acrylated glycerol (AG).

Example 2—RAFT Polymerization of PLLA with Acrylated Epoxidized Soybean Oil (AESO) (20% PLLA Content)

Figure 2:
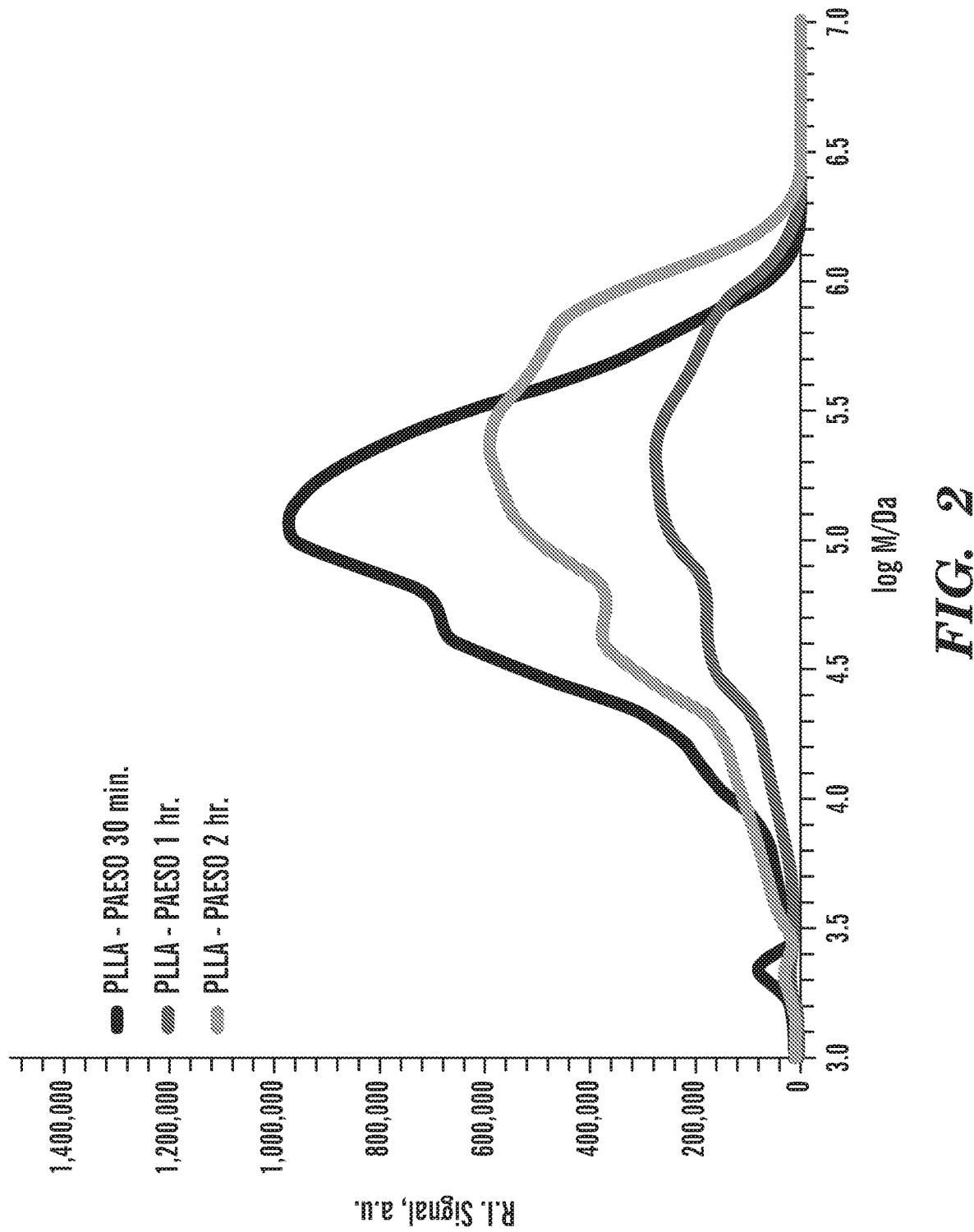
FIG. 2 is a graph showing gel permeation trace of PLLA-PAESO block copolymer to establish control of RAFT polymerization.

PLLA was obtained in 1 kg spools used for 3D printers; the polymer was then solubilized in chloroform. Monomers: PLLA-Macro CTA (2 grams) and AESO (8 grams) were mixed with chloroform (4:1 ratio of solvent to monomer). AIBN was then added in solution with chloroform at a concentration of 1.5%. The ratio of AIBN added was 1.0:0.4 of CTA to AIBN (purified AESO). The ratio of AIBN added was 1.0:0.8 of CTA to AIBN (unpurified AESO). Reaction was performed at 65° C. under reflux. FIG. 2 shows a gel permeation trace of PLLA-PAESO block copolymer to establish control of RAFT polymerization.

Example 3—RAFT Polymerization of PLLA with Acrylated Glycerol (AG)

Figure 3:
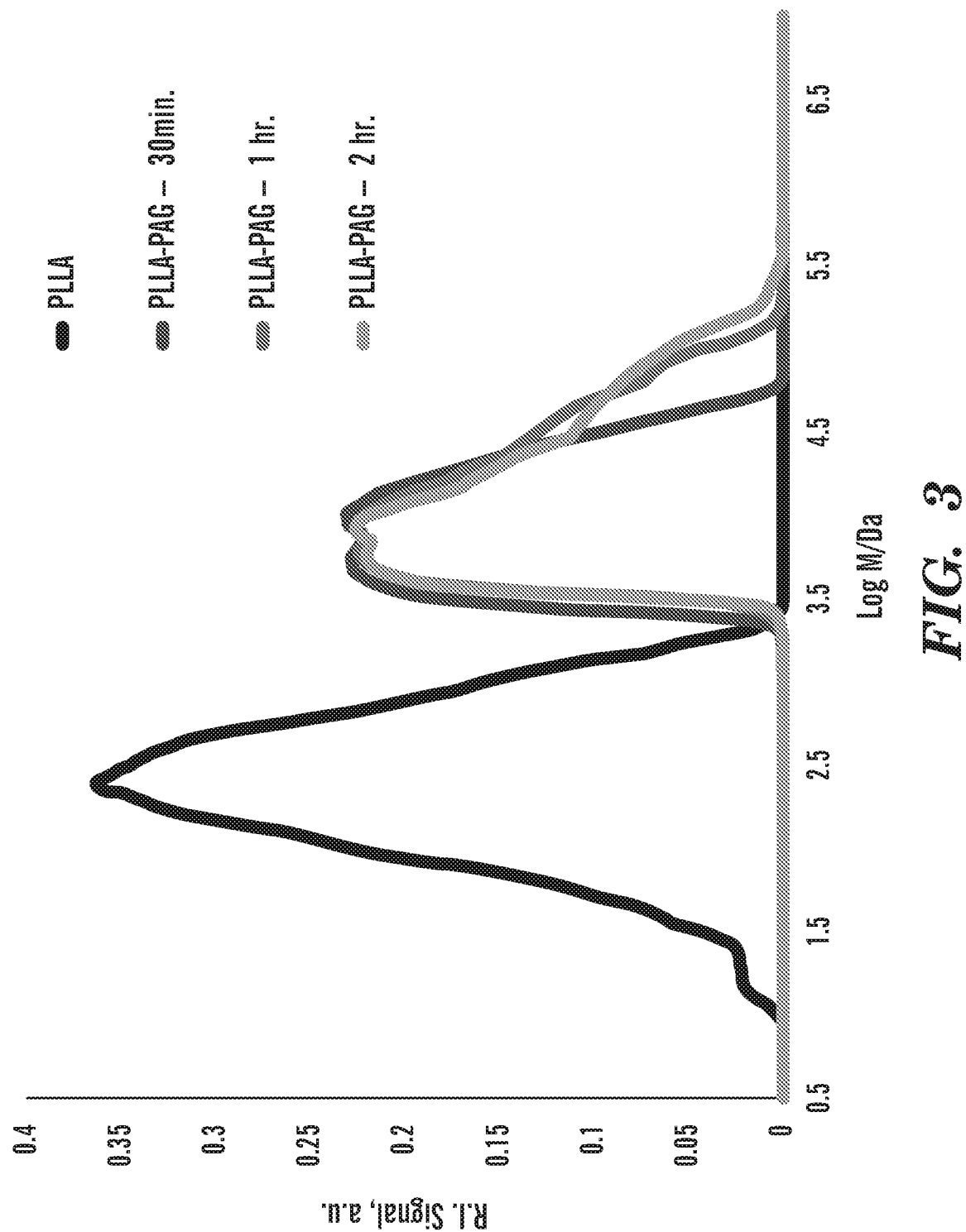
FIG. 3 is a graph showing gel permeation of Poly L-Lactic Acid~Poly-Acrylated Glycerol (PLLA-PAG) block copolymer to establish control of RAFT polymerization.

Monomers: PLLA-Macro CTA (2 grams) and AG (8 grams) were mixed with 1 part chloroform to 3 parts DMSO (DMSO was used as the AG and the PLLA would not dissolve in any other solvents). A solvent mixture was used at a 4:1 ratio of solvent to monomer. AIBN was then added in solution with chloroform at a concentration of 1.5%. The ratio of AIBN added was 1.0:0.4 of CIA to AIBN (purified AESO). The ratio of AIBN added was 1.0:0.8 of CTA to AIBN (unpurified AESO). The reactions were performed at 80° C. under reflux. FIG. 3 shows gel permeation of the Poly L-Lactic Acid Poly-Acrylated Glycerol (PLLA-PAG) block copolymer to establish control of RAFT polymerization.

Example 4—Material Characterization

Table 1 shows the list of RAFT block co-polymer sets of polymerized (L) lactic acid with polymerized acrylated epoxidized soybean oil and polymerized acrylated glycerol materials with their proper reaction time, AIBN to CTA ratio (mol basis), solvent to monomer ratio (vol basis), and different PLLA concentrations.

TABLE 1

List of RAFT Block Co-polymer sets of Polymerized (L) lactic acid with Polymerized Acrylated Epoxidized Soybean Oil and Polymerized Acrylated Glycerol.

|  | PLLA-PAESO 7 (2.6 functionality) | PLLA-PAESO 2 (2.4 functionality) | PLLA-AG 2 (1.5 functionality) |
| --- | --- | --- | --- |
| Date | May 30, 2014 | Dec. 20, 2014 | Dec. 20, 2014 |
| PLLA-Macro CTA (g) | 5 | 2 | 2 |
| AESO (g) | 5 | 8 | 8 |
| AIBN (g) | 0.006 | 0.003 | 0.003 |
| Chloroform (mL) | 16 | 40 | 20 mL Chloroform/ 20 mL DMS0 |
| Reaction Time | 1 hr | 2 hrs | 1 hr |
| PLLA % content | 53.47% | 19.11% | No GPC |

Example 5—Procedure for Calculating the PLLA % in the Block Copolymer Using $^1$H-NMR Proton nuclear magnetic resonance was used to calculate the conversion of acrylic acid to acrylic groups (Scheme 4). Scheme 4 shows a PLLA molecule in which the hydrogens utilized to quantify the percentage of PLLA in the diblock are circled. The $^1$H-NMR peaks for these hydrogens are located between the ranges of 5.1-5.3 ppm.

Scheme 4

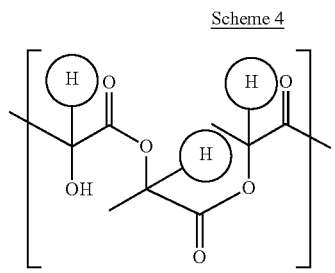

1. Correct the baseline.
2. Take integral over the area of the doublet located between 4.0-4.2 ppm.
3. Take the integral over the area of the terminal methyl peak between 0.8-0.7 ppm.
4. Take the integral over the area of the first peak between 5.6-5.8 ppm to quantify the acrylate peaks.
5. Set the doublet peak between 4.0-4.2 ppm to 4.
6. Phase adjust the NMR until the terminal methyl peak reads 9; while the doublet at 4.0-4.2 remains at 4.
7. Take the integral over the area of the PLLA's hydrogens (5.1-5.3 ppm, see Scheme 4).

FIG. 1 shows the Hydrogen Nuclear Magnetic Resonance ($^1$H-NMR) analysis of the PLLA-PAESO block copolymer used to determine the composition of 10% of PLLA to PAESO. The $^1$H-NMR was performed on a Bruker Avance III 600 MHz using deuterated chloroform as the solvent.

Figure 4:
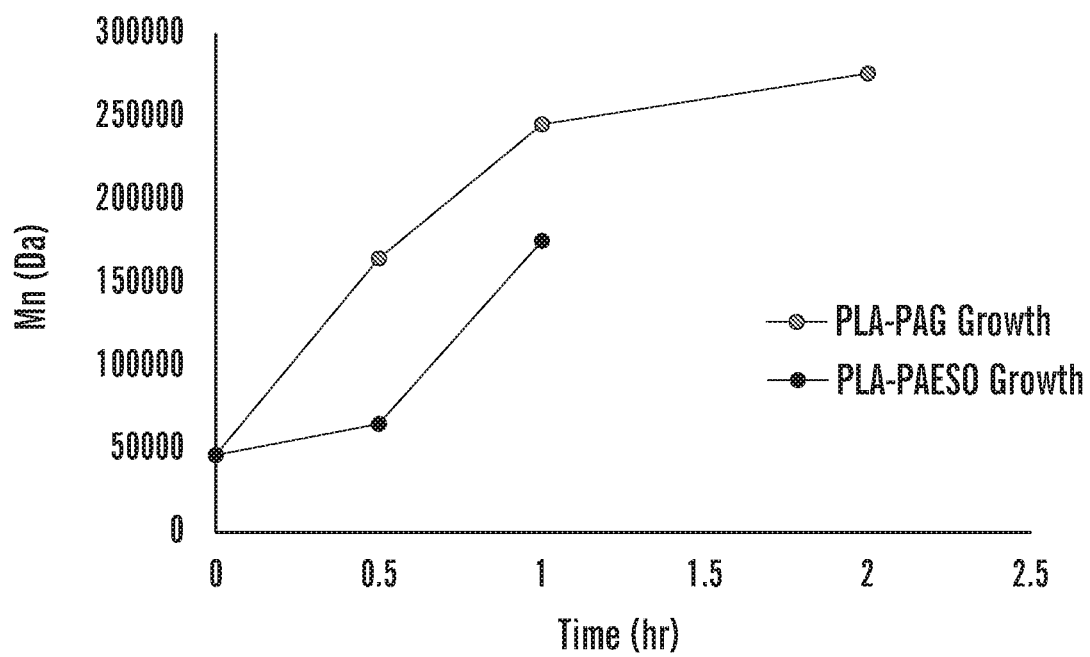
FIG. 4 is a graph showing the molecular weight increase versus time of PLLA-PAESO and PLLA-PAG block copolymers.

Molecular weight distribution of the diblocks was calculated using a Malvern Viscotek 350B high temperature gel permeation chromatograph using dimethylformamide as eluent. The instrument included: a differential refractive index (RI) detector (using PMMA standards), a right angle (90°) and low angle (7°) light scattering detector, and a viscometer detector to deliver molecular characterization of a sample. FIG. 2 shows the gel permeation trace of the PLLA-PAESO block copolymer at different reaction times. This graph demonstrates the CTA is able to control the growth of the polymer. FIG. 3 shows the gel permeation of the PLLA-PAG block copolymer at different reaction times. This graph demonstrates the CTA is able to control the growth of the polymer. FIG. 4 is a graph showing the molecular weight increase versus time of PLLA-PAESO and PLLA-PAG block copolymers. The graph shows a gradual increase in molecular weight giving evidence a RAFT polymerization.

Figure 5:
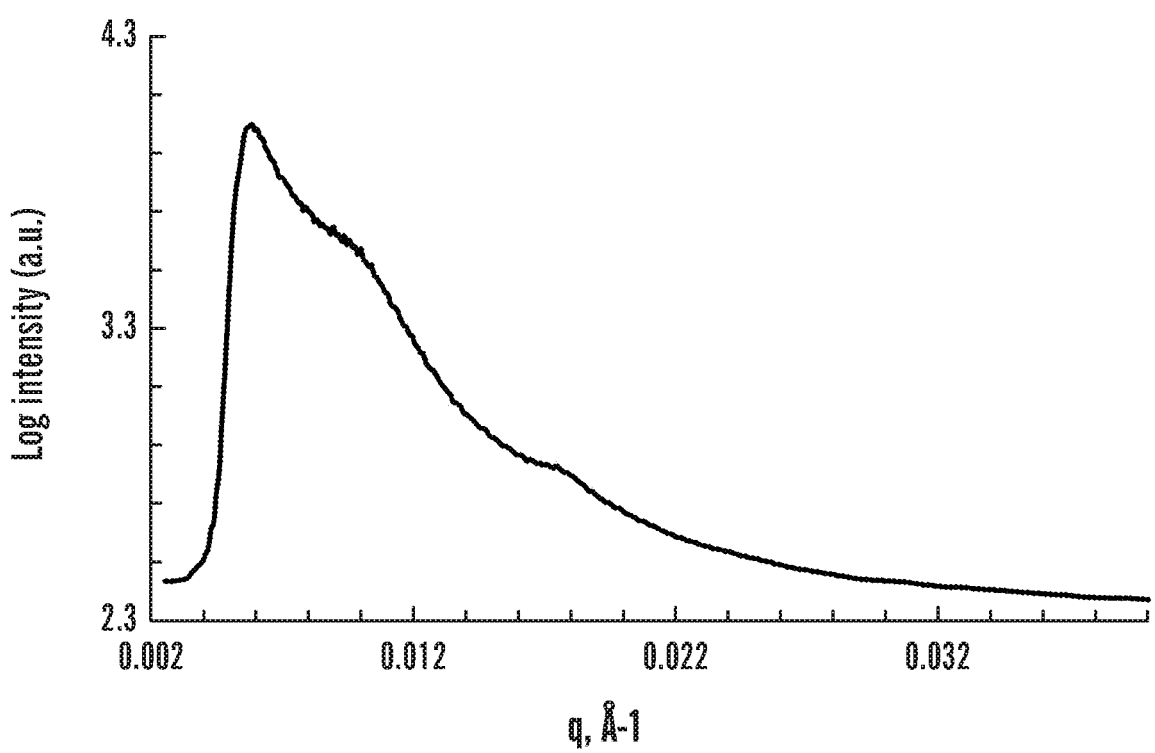
FIG. 5 is a graph showing small angle X-ray light scattering of PLLA-PAG block copolymer.

FIG. 5 shows small angle X-ray light scattering of PLLA-PAG block copolymer. The three scattering peaks shown in FIG. 5 (roughly at 0.0100, 0.01798, and 0.03094 Å$^{-1}$) coincide with a lamellae structure according with a 1:2:3 ratio (Chu et al., "Small Angle X-ray Scattering of Polymers," *Chemical Reviews* 101(6):1727-1761 (2001), which is hereby incorporated by reference in its entirety).

Figure 6:
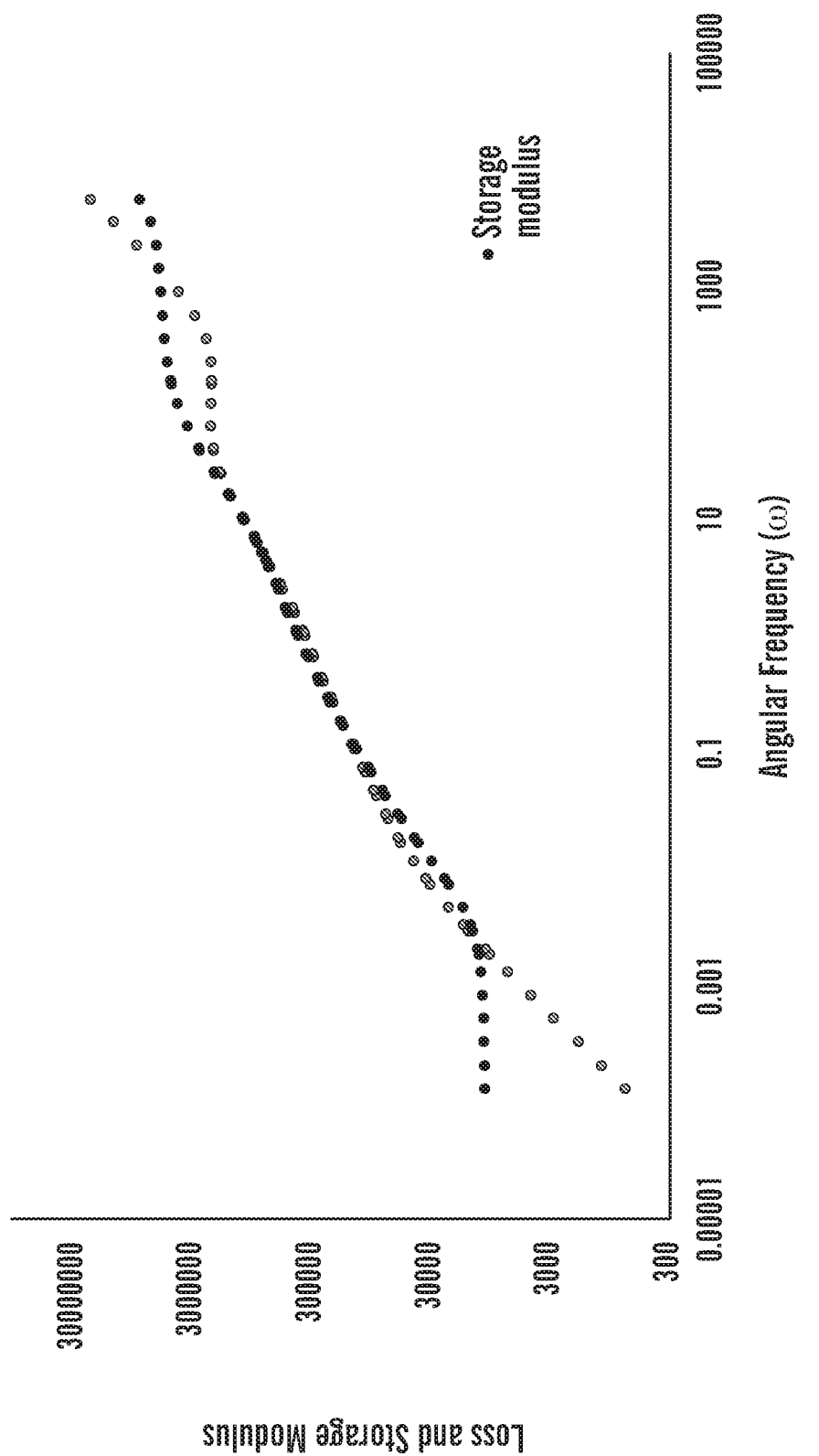
FIG. 6 is a graph showing master curve of (PLLA-PAG) on 8 mm parallel plates between 80-(−40) ° C. with a reference temperature of 20° C.

Ares G2 Strain Controlled Rheometer was used to study the viscoelastic properties of the materials. FIG. 6 shows the master curve of the PLLA-PAG block copolymer using a reference temperature of 20° C. and the phase angle as a function of angular frequency. A small plateau modulus can be seen between frequency 0.1 and 10 rad/s giving evidence that the polymer is entangled. This plateau modulus is located at $3.0 \times 10^5$ Pa making it an ideal candidate to use as a pressure sensitive adhesive (PSA) (Hiemenz et al., "Polymer Chemistry," CRC press p. 448 (2007), which is hereby incorporated by reference in its entirety). The plateau modulus location is essential for the characterization of the material and determining its end application. In FIG. 6 the plateau modulus location shows that this polymer has acceptable tacticity (being at or below $3 \times 10^5$ Pa) and a rubbery like response at room temperature.

This technology enables the development of "green" and economical alternatives to petro-chemically derived copolymers. Polymers in a variety of compositions can be produced that can serve as pressure-sensitive adhesives; sealants; components of tires, shoes, consumer electronics, etc.; bitumen modifiers, or viscosity modifiers for consumer care products.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A method of preparing a multiblock copolymer, said method comprising:
   providing a block copolymer comprising at least one PA block and at least one PB block, wherein PA represents a polymer block comprising one or more units of monomer A and PB represents a polymer block comprising one or more units of monomer B, with monomers A and B being the same or different, wherein the block copolymer contains a chain transfer agent moiety (CTA);
   providing a radically polymerizable monomer C,
   wherein the monomer A is selected from the group consisting of L-lactic acid, adipic acid, ethylene glycol, terephthalic acid, dihydromuconic acid, benzene-1,4-dicarboxylic acid, glucose, glycogen, galactose, silk, glycerol, 1,6-diaminohexane, and 1,4-diaminobenzene;
   wherein the monomer B is selected from the group consisting of L-lactic acid, styrene, α-methyl styrene, t-butyl styrene, vinyl xylene, vinyl naphthalene, vinyl pyridine, divinyl benzene, methyl acrylate, methyl (meth)acrylate, ethyl (meth)acrylate, propyl (meth)acrylate, butyl (meth)acrylate, heptyl (meth)acrylate, hexyl (meth)acrylate, acrylonitrile, adiponitrile, methacrylonitrile, butadiene, isoprene, and mixtures thereof;
   wherein the monomer C is selected from the group consisting of styrene, α-methyl styrene, t-butyl styrene, vinyl xylene, vinyl naphthalene, vinyl pyridine, divinyl benzene, methyl acrylate, methyl (meth)acrylate, ethyl (meth)acrylate, propyl (meth)acrylate, butyl (meth)acrylate, heptyl (meth)acrylate, hexyl (meth)acrylate, acrylonitrile, adiponitrile, methacrylonitrile, butadiene, isoprene, and mixtures thereof; or
   wherein the monomer C is a radically polymerizable glycerol derivative; an acrylated epoxidized triglyceride; an acrylated glycerol; an acrylated epoxidized soybean oil (AESO); or a radically polymerizable plant oil monomer selected from the group consisting of soybean oil, corn oil, linseed oil, flax seed oil, and rapeseed oil; and
   polymerizing the block copolymer with monomer C under conditions effective to achieve a number average degree of polymerization ($N_n$) for the multiblock copolymer of up to 100,000 without gelation.

2. The method of claim 1, wherein the block copolymer has an architecture of PA-CTA-PB.

3. The method of claim 1, wherein the chain transfer agent has a telechelic (TCTA) character with molecular structure as S—C(S)–S–.

4. The method of claim 1, wherein the block copolymer has a telechelic (TCTA) character and an architecture of PA-PB-TCTA-PB, PA-PB-TCTA-PA, PA-TCTA-PB-PA, or PA-PB-TCTA-PB-PA.

5. The method of claim 1, wherein said providing the block copolymer comprises:
   a) providing a polymer comprising at least one PA block, wherein one end or both ends of the PA block is functionalized with a chain transfer group or an initiator group;
   b) providing a polymer comprising at least one PB block, wherein one end or both ends of the PB block is functionalized with a chain transfer group or an initiator group; and
   c) reacting the polymer comprising the at least one functionalized PA block with the polymer comprising the at least one functionalized PB block under conditions effective to produce the block copolymer.

6. The method of claim 5, wherein said providing the polymer comprising the at least one PA block comprises:
   providing a monomer A;
   polymerizing the monomer A, by step growth polymerization, in a solvent suitable for dissolving the at least one PA block; and
   functionalizing the at least one PA block with one or more chain transfer groups or one or more initiator groups to produce a functionalized PA block.

7. The method of claim 5, wherein said providing the polymer comprising the at least one PB block comprises:
   providing a monomer B;
   polymerizing the monomer B in a solvent suitable for dissolving the at least one PB block; and
   functionalizing the at least one PB block with one or more chain transfer groups or one or more initiator groups to produce a functionalized PB block.

8. The method of claim 1, wherein said providing the block copolymer comprises:
   a) providing a polymer comprising at least one PA block, wherein one end or both ends of the PA block is functionalized with a chain transfer group or an initiator group;
   b) providing a radically polymerizable monomer B; and
   c) polymerizing the at least one functionalized PA block with the radically polymerizable monomer B under conditions effective to achieve a number average degree of polymerization ($N_n$) for the block copolymer of up to 100,000 without gelation.

9. The method of claim 8, wherein said providing the polymer comprising at least one PA block comprises:
   providing a monomer A;
   polymerizing the monomer A, by step growth polymerization, in a solvent suitable for dissolving at least one PA block; and functionalizing the at least one PA block with one or more chain transfer groups or one or more initiator groups to produce a functionalized PA block.

10. The method of claim 1, wherein said polymerizing is carried out by (i) reversible addition-fragmentation chain-transfer polymerization (RAFT), in the presence of a free radical initiator and a solvent.

11. The method of claim 10, wherein the solvent is glycerol, toluene, THF, chloroform, cyclohexane, dioxane, dimethyl sulfoxide, dimethyl formamide, acetone, acetonitrile, n-butanol, n-pentanol, chlorobenzene, dichloromethane, diethylether, tert-butanol, 1,2,-dichloroethylene, diisopropylether, ethanol, ethylacetate, ethylmethylketone, heptane, hexane, isopropylalcohol, isoamylalcohol, methanol, pentane, n-propylacohol, pentachloroethane, 1,1,2,2,-tetrachloroethane, 1,1,1,-trichloroethane, tetrachloroethylene, tetrachloromethane, trichloroethylene, water, xylene, benzene, nitromethane, or a mixture thereof.

12. The method of claim 10, wherein the free radical initiator is selected from the group consisting of benzoyl peroxide, azobisisobutyronitrile, 1,1'-azobis(cyclohexanecarbonitrile), t-butylperoxide, and dicumylperoxide.

13. The method of claim 10, wherein said polymerizing is carried out in the presence of a chain transfer agent.

14. The method of claim 1, wherein said polymerizing is carried out by atom transfer radical polymerization (ATRP), in the presence of a solvent, a catalyst, a counter catalyst, an initiator, and a ligand.

15. The method of claim 14, wherein the solvent is toluene, THF, chloroform, cyclohexane, or a mixture thereof.

16. The method of claim 14, wherein the catalyst is a transition metal compound.

17. The method of claim 14, wherein the initiator is an aryl halide or an aryalkyl halide.

18. The method of claim 14, wherein the ligand is a N-, O-, P-, or S-containing compound capable of coordinating with the transition metal in a form of a σ- or π-bond.

19. The method of claim 1, wherein the monomer C has a concentration, when dissolved in a solvent, ranging from 5% to 100 wt %.

20. The method of claim 1, wherein the multiblock copolymer has a molecular weight ($M_n$) ranging from 7 kDa to 10,000 kDa.

21. The method of claim 1 further comprising:
catalytically hydrogenating reactive unsaturated sites in the PA, PB, or PC block to partial or full saturation after said polymerizing.

22. The method of claim 1 further comprising:
polymerizing the multiblock copolymer with the monomer A, the monomer B, the monomer C, both the monomer B and the monomer C, or both the monomer A and the monomer C, both the monomer A and the monomer B, or the monomer A, the monomer B, and the monomer C under conditions effective to form an extended multiblock copolymer.

23. The method of claim 1, wherein monomers A and B are being different and the block copolymer has an architecture of PA-PB-CTA.

* * * * *